(12) United States Patent
Driesner et al.

(10) Patent No.: US 7,707,584 B2
(45) Date of Patent: Apr. 27, 2010

(54) METHOD AND APPARATUS FOR SYNCHRONIZING CALLS IN A SERVER AND CLIENT SYSTEM

(75) Inventors: Carsten Driesner, Hamburg (DE); Thorsten O. Laux, Hamburg (DE)

(73) Assignee: Oracle America, Inc., Redwood Shores, CA (US)

( * ) Notice: Subject to any disclaimer, the term of this patent is extended or adjusted under 35 U.S.C. 154(b) by 1289 days.

(21) Appl. No.: 10/021,260

(22) Filed: Dec. 19, 2001

(65) Prior Publication Data

US 2002/0083211 A1 Jun. 27, 2002

(30) Foreign Application Priority Data

Dec. 22, 2000 (EP) .................................. 00128214

(51) Int. Cl.
*G06F 3/00* (2006.01)
*G06F 9/44* (2006.01)
*G06F 9/46* (2006.01)
*G06F 13/00* (2006.01)

(52) U.S. Cl. ...................................... 719/313; 718/100
(58) Field of Classification Search ................. 719/318, 719/313, 330; 709/248; 718/106, 108
See application file for complete search history.

(56) References Cited

U.S. PATENT DOCUMENTS

| | | | | |
|---|---|---|---|---|
| 5,485,626 | A * | 1/1996 | Lawlor et al. ................ | 719/315 |
| 6,026,427 | A * | 2/2000 | Nishihara et al. ............ | 718/106 |
| 6,137,645 | A * | 10/2000 | Harumatsu ................... | 360/49 |
| 6,216,150 | B1 * | 4/2001 | Badovinatz et al. ......... | 718/106 |
| 6,490,727 | B1 * | 12/2002 | Nazarathy et al. ........... | 725/129 |
| 6,625,621 | B2 * | 9/2003 | Tan et al. ..................... | 707/201 |
| 6,826,752 | B1 * | 11/2004 | Thornley et al. ............ | 718/100 |

(Continued)

FOREIGN PATENT DOCUMENTS

EP 0955584 A2 11/1999

(Continued)

OTHER PUBLICATIONS

Coulouris, George, Jean Dollimore and Tim Kindberg. "Distributed Systems Concepts and Design." Second Edition, Addison-Wesley; 1994; pp. 2, 114-118, 134-138, 149-153, 325-327, 340-345.*

(Continued)

*Primary Examiner*—Diem K Cao
(74) *Attorney, Agent, or Firm*—Marsh Fischmann & Breyfogle LLP

(57) ABSTRACT

In a client and server system the execution of calls is synchronized to maintain a correct execution of a service application. At the server, calls are executed asynchronously by a plurality of threads, and when a thread change occurs, a synchronization call is generated and transmitted to the client, including a server call counter value indicating a number of calls executed at the server. With every synchronization call, the client determines whether the server call counter value corresponds to a current client call counter value. If the counter values are identical, the correct sequence of execution is maintained, but if they differ, an overtake condition has occurred, indicating that service calls from a first thread were overtaken by a second thread. The thread and service calls which have overtaken other service calls are placed into a wait condition to maintain the correct order of execution of service calls.

24 Claims, 7 Drawing Sheets

U.S. PATENT DOCUMENTS 6,957,436 B1 * 10/2005 Mihic .................. 718/107

FOREIGN PATENT DOCUMENTS

EP 0955584 A3 3/2001

OTHER PUBLICATIONS

Liedtke, Jochen. "Improving IPC by Kernel Design," ACM Symposium on Operating Systems Principles, Proceedings of the fourteenth ACM Symposium on Operating Systems Principles, ACM Press, 1994; pp. 175-188.*

Fidge, Colin. "Logical Time in Distributed Computing Systems," Computer, vol. 24, Issue 8, Aug. 1991, pp. 28-33, ISSN: 0018-9162; retrieved from IEEE.*

Coulouris, George, Jean Dollimore and Tim Kindberg. "Distributed Systems Concepts and Design." Second Edition, Addison-Wesley; 1994; pp. 10-21,100-108,165-178,182-190,297-309,354-356,392-405.*

M. Frans Kaashoek, Andrew S. Tanenbaum, "Group Communication In The Amoeba Distributed Operating System", Proceedings of the International Conference on Distributed Computing Systems, May 20, 1991, pp. 222-230, vol. 11, IEEE Computer Society Press, Los Alamitos, US.

* cited by examiner

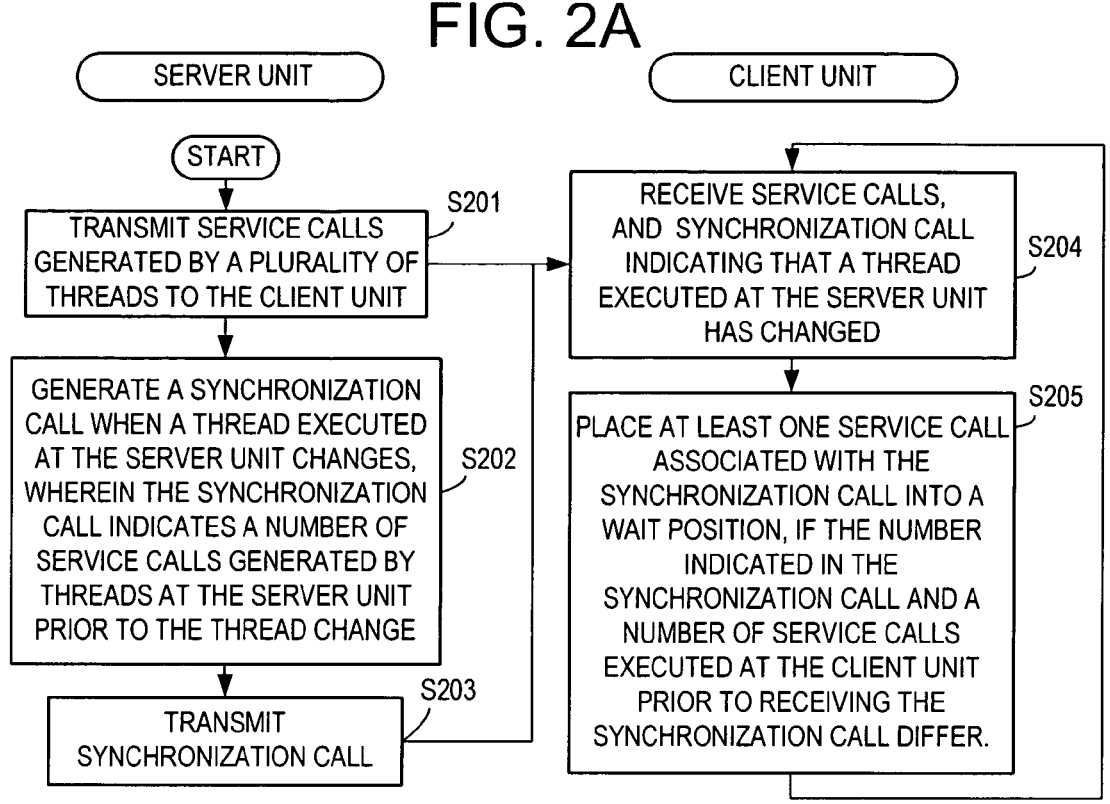
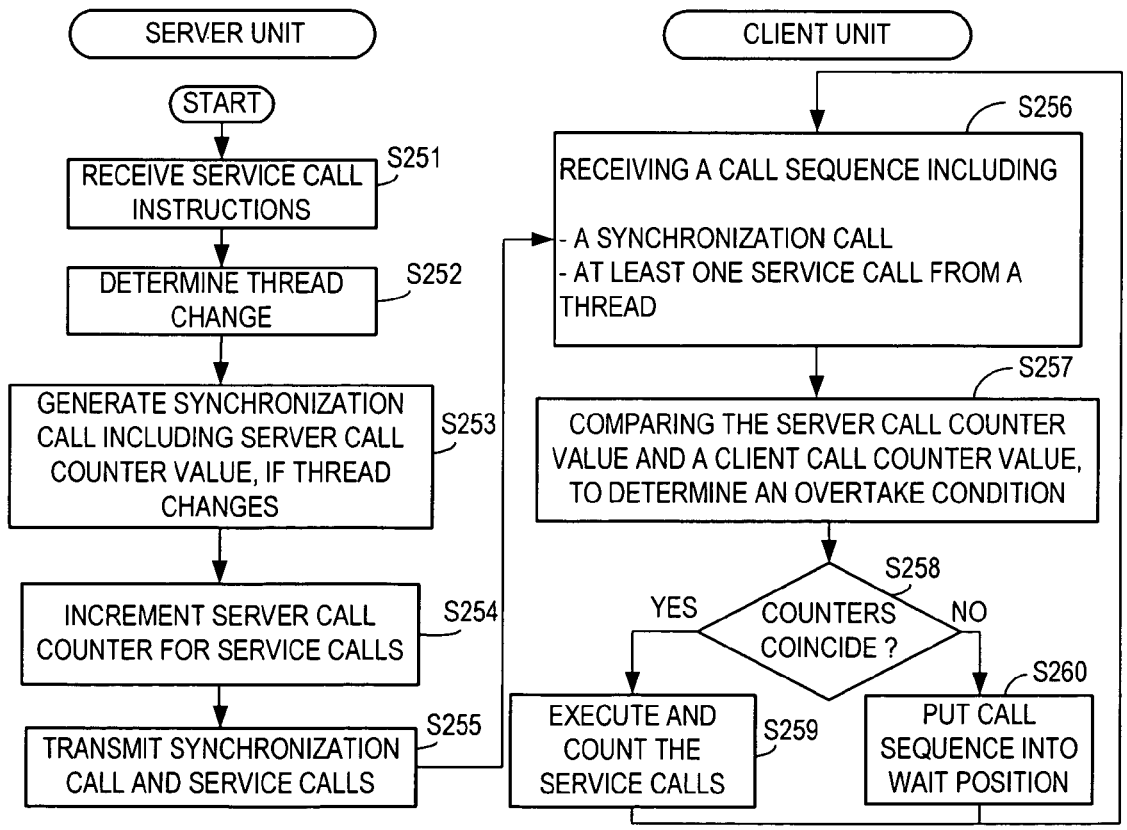

METHOD AND APPARATUS FOR SYNCHRONIZING CALLS IN A SERVER AND CLIENT SYSTEM

The present invention claims priority from EP 00128214.4, filing date of Dec. 22, 2000, the contents of which are herein incorporated by reference.

BACKGROUND OF THE INVENTION

1. Field of the Invention

The invention relates to synchronizing the execution of calls at a server and a client in a server and client system.

2. Description of the Related Art

With the availability of modern communication networks connecting large numbers of data processing devices, an increasing number of applications or services for users is executed involving more than a single data processing device.

A large number of such distributed applications are available today and may be executed on a plurality of data processing devices. Distributed applications may, for example, include office applications such as managing documents and data files, and may include visualizing information, banking services, shopping services and the like.

A distributed application or service may be executed involving a server data processing device and a client data processing device, the client data processing device being operated by a user. A user may, for example, launch a distributed application by entering a suitable instruction at the client data processing device. The client data processing device will then connect to the server data processing device to execute the application. Some parts of modules of the application may reside on the client data processing device, whereas other parts or modules of the application may reside at the server data processing device. The distributed application requires a potentially complex cooperation between modules executed at the client data processing device and modules of the distributed application executed at the server data processing device.

For example, a distributed application involving visualizing a document at the client data processing device may include (1) application modules executed at the server for processing or rendering the document in order to convert the document into a format which may be displayed at a display unit of the client, and (2) modules executed at the client data processing device for receiving frames for local display and supplying the frames to a display unit. If the user, moreover, wishes to edit the document, control information and further information to be visualized may be exchanged between the client data processing device and the server data processing device.

The above modules or parts of the distributed application at the client and at the server may run on data processing units starting corresponding processes. Such a process may involve the execution of one or a plurality of different threads, each of the threads generating a plurality of individual service calls, i.e., service calls to be transmitted to the client or server.

In order to achieve acceptable performance, the individual threads of the processes may be executed asynchronously, i.e., calls of different threads are not executed in a predetermined given sequence, as this could lead to delays for example, if one thread waits for a return message. Instead, the calls are executed asynchronously, i.e., if a thread for example, waits for a return message or the like, other threads may be executed.

An asynchronous execution of an application may be guarded by a MUTEX (Mutually Exclusive), i.e., a programming flag used to grab and release an object or thread when data is acquired that cannot be shared between different threads, or processing can be started that cannot be performed simultaneously elsewhere in the system. If exclusive operation of one thread must be shared, the MUTEX locks other attempts to use the respective resources of the system. The MUTEX unlocks the resources when the resources are no longer needed or a particular thread is finished.

In a scenario where a distributed application is executed at a server data processing device and a client data processing device, a MUTEX or scheduler may be used to guard the asynchronous execution of tasks at the server.

However, since the scheduler is only available at the server, calls from different threads which interact with the client, i.e., for exchanging data, sending requests and commands and the like, may overtake one another on the client side due to the scheduled execution at the server.

Thus, the sequence of calls from different threads at the server, due to the fact that the exact sequence of calls of different threads, i.e., the operation of the scheduler, is not known at the client, may not be maintained when executing the corresponding calls of corresponding threads at the client.

Further, if different calls from different threads overtake each other, processing results may be unacceptable. For example, in a visualization application, as a practical example, drawn objects on a client display unit may be moved from the foreground to the background, as a drawing sequence of objects may be changed.

Accordingly, the synchronization of the execution of calls of different threads at the server and the client is not maintained and causes unacceptable processing results.

It is therefore desirable to provide an improved method and system to allow the synchronization of the execution of calls in a client and server system.

SUMMARY OF THE INVENTION

Methods and systems consistent with the present invention include synchronizing the execution of calls of different threads at a server and a client with minimal communication overhead to achieve acceptable processing results.

Methods and systems consistent with one embodiment of the present invention include a data processing system for synchronizing calls at a client in a server and client system, including receiving a plurality of service calls generated by a plurality of threads executed at the server; receiving a synchronization call from the server, the synchronization call indicating that one of the plurality of threads executed at the server has changed and indicating a number of service calls generated by the plurality of threads at the server prior to the thread change; and placing at least one of the service calls associated with the synchronization call into a wait position, if the number indicated in the synchronization call and the number of service calls executed at the client prior to receiving the synchronization call differ.

According to the above described embodiment consistent with the present invention, a synchronization call may be generated at the server each time a thread identifier placing a call changes. The synchronization call is transmitted to the client to allow the client to synchronize the execution of the service calls received from the server. As service calls from different threads can generally only overtake each other upon a thread change at the server, the synchronization calls suffice for establishing the correct order of execution of calls from different threads at the client. Thus, a synchronization can be maintained with minimized communication load between the server and the client.

Advantageously, the above described method consistent with the present invention may include receiving at the client, a first call sequence of a plurality call sequences from the server, the first call sequence including a first synchronization call and at least one service call from a first thread, the first synchronization call including a first server call counter value indicating the number of service calls executed at the server unit prior to the first synchronization call; comparing the first server call counter value and a client call counter value, the client call counter value indicating the number of service calls executed at the client prior to receiving the first synchronization call; executing the service calls of the first call sequence and counting the executed service calls using the client call counter value, if the client call counter value and the first server call counter value coincide; and placing the first call sequence into a wait position, if the client call counter value and the first server current call counter value differ.

Further, the method for synchronizing calls at a client consistent with the present invention, may include determining whether a second call sequence in a wait position is available, the second call sequence including service calls from a second thread executed at the server and a second synchronization call including a second server call counter value indicating a number of service calls executed at the server prior to the second synchronization call, the second server call counter value coinciding with the client call counter value; and executing the service calls of the second call sequence and incrementing the client counter value for each executed service call, if the second call sequence is available.

Thus, threads with call sequences placed in a wait position may advantageously be started upon reaching the correct client call counter value, i.e., the counter value indicated in the synchronization call.

The client may wait for a third call sequence to be received from the server, the third call sequence including a third synchronization call including a third server call counter value coinciding with the client call counter value.

Thus, if the counter value of a synchronization call of a current call sequence does not match the current client call counter value and a call sequence with a correct counter value is not available, the client may be placed in a wait position, until a call sequence with a correct counter value arrives.

The call sequences may be received from the server as packets upon one of the group including a timer signal at the server; a synchronous call at the server; and a synchronization call at the server. This provides flexibility in transmitting service calls to the client, in order to further increase the performance of the synchronization.

A synchronization call may include a thread identifier of the thread which generated the service calls of the call sequence; the service calls may include the thread identifier of the thread generating the service call; wherein the synchronization calls and the service calls are received in an arbitrary order.

Providing thread identifiers may facilitate grouping service calls to call sequences at the client.

The service calls at the client and server may be executed asynchronously; and the service calls from a plurality of different threads at the server may be executed in corresponding threads at the client.

The server call counter value may indicate a total number of service calls at the server executed prior to the current service call and requiring communication with the client; and the client call counter value may correspondingly indicate a total number of service calls executed at the client involving communication with the server.

A service call from the server to the client may indicate at least one of drawing instructions to display information on a display of the client; rendering instructions; storing instructions to store information at the client; and information on processing results from the server.

According to another embodiment consistent with the present invention, a method of synchronizing calls at a server in a server and client system includes transmitting service calls generated by a plurality of threads at the server to a client; generating a synchronization call when a thread executed at the server changes, the synchronization call indicating a number of service calls generated by threads at the server prior to the thread change; and transmitting the synchronization call to the client for allowing the client to synchronize a service call execution, i.e., for enabling the client to place at least one service call associated with the synchronization call into a wait position, if the number indicated in the synchronization call and a number of service calls executed at the client prior to receiving the synchronization call differ.

Advantageously, the method of synchronizing calls at a server in a server and client system consistent with the present invention may include generating a current service call by a first thread executed at the server; determining a first thread identifier of the first thread and comparing the first thread identifier with a second thread identifier of a second thread which issued a service call preceding the current service call; wherein if the first thread identifier and the second thread identifier differ, generating a first synchronization call including a server call counter value indicating the number of service calls executed at the server prior to the current service call and transmitting the first synchronization call to the client, for enabling the client to synchronize the execution of a plurality of calls from at least the first and second thread; counting the current service call using the server call counter value; and transmitting the current service call to the client.

A plurality of service calls from the first thread and the synchronization call may constitute a call sequence; and the call sequences may be transmitted to the client as a packet unit upon one of the group including a timer signal; a synchronization call; and a synchronous call.

The server call counter value may indicate a total number of service calls requiring communication with the client executed at the server prior to the current service call.

A synchronization call may further be generated upon the occurrence one of the group including a timer signal; a predetermined number of service calls; and a synchronous call.

Methods and systems according to another embodiment consistent with the present invention include a data processing system of synchronizing calls in a client and server system, the method including the steps of transmitting a plurality of service calls generated by a plurality of threads executed at the server to the client; generating a synchronization call at the server, the synchronization call indicating that one of the plurality of threads executed at the server has changed and indicating a number of service calls generated by the plurality of threads at the server prior to the thread change; transmitting the synchronization call to the client to allow the client to synchronize a service call execution; receiving the synchronization call at the client; and placing at least one of the service calls associated with the synchronization call into a wait position, if the number indicated in the synchronization call and the number of service calls executed at the client prior to receiving the synchronization call differ.

Methods and systems consistent with another embodiment of the present invention include a computer readable medium containing instructions that cause a data processing system to perform a method of synchronizing calls in a client and a server system, the method including the steps of transmitting a plurality of service calls generated by a plurality of threads executed at the server to the client; generating a synchronization call at the server, the synchronization call indicating that one of the plurality of threads executed at the server has changed and indicating a number of service calls generated by the plurality of threads at the server prior to the thread change; transmitting the synchronization call to the client to allow the client to synchronize a service call execution; receiving the synchronization call at the client; and placing at least one of the service calls associated with the synchronization call into a wait position, if the number indicated in the synchronization call and the number of service calls executed at the client prior to receiving the synchronization call differ.

Methods and systems consistent with the present invention include a data processing system for synchronizing calls in a client and server system, the data processing system including a client computer having a memory including a client program that receives a plurality of service calls generated by a plurality of threads executed at the server, that receives a synchronization call from the server, the synchronization call indicating that one of the plurality of threads executed at the server has changed and indicating a number of service calls generated by the plurality of threads at the server prior to the thread change, and that places at least one of the service calls associated with the synchronization call into a wait position, if the number indicated in the synchronization call and the number of service calls executed at the client prior to receiving said synchronization call differ; and a processor that runs the client program; and a server computer including a memory including a server program that transmits a plurality of service calls generated by a plurality of threads at the server to the client, that generates a synchronization call when a thread of the plurality of threads executed at the server changes, the synchronization call indicating a number of service calls generated by the plurality of threads at the server prior to the thread change, and that transmits the synchronization call to the client to allow the client to synchronize a service call execution; and a processor that runs the server program; and a network connecting the client computer and the server computer.

Methods and systems consistent with the present invention include an apparatus for synchronizing calls in a client and server system, the apparatus including means for transmitting a plurality of service calls generated by a plurality of threads executed at the server to the client; means for generating a synchronization call at the server, the synchronization call indicating that one of said plurality of threads executed at the server has changed and indicating a number of service calls generated by said plurality of threads at the server prior to the thread change; and means for transmitting the synchronization call to the client to allow the client to synchronize a service call execution; and means for receiving the synchronization call at the client; and means for placing at least one of the service calls associated with the synchronization call into a wait position, if the number indicated in the synchronization call and the number of service calls executed at the client prior to receiving the synchronization call differ.

There has thus been outlined, rather broadly, some features consistent with the present invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 2a depicts a flowchart of the steps performed by the program depicted in FIG. 1 according to another embodiment in accordance with methods and systems consistent with the present invention;

FIG. 2b depicts a flowchart of the steps performed by the program depicted in FIG. 1 according to another embodiment in accordance with methods and systems consistent with the present invention;

DETAILED DESCRIPTION OF THE PREFERRED EMBODIMENTS

Methods and systems consistent with the practice of the present invention include synchronizing the execution of calls of different threads at a server and a client, such that a transmission overhead for synchronization may be considerably reduced, thus increasing performance of the system, particularly if a communication link between the client and the server has a low bandwidth, for example, in case of a plain-old-telephone-service (POTS) connection.

Figure 1:
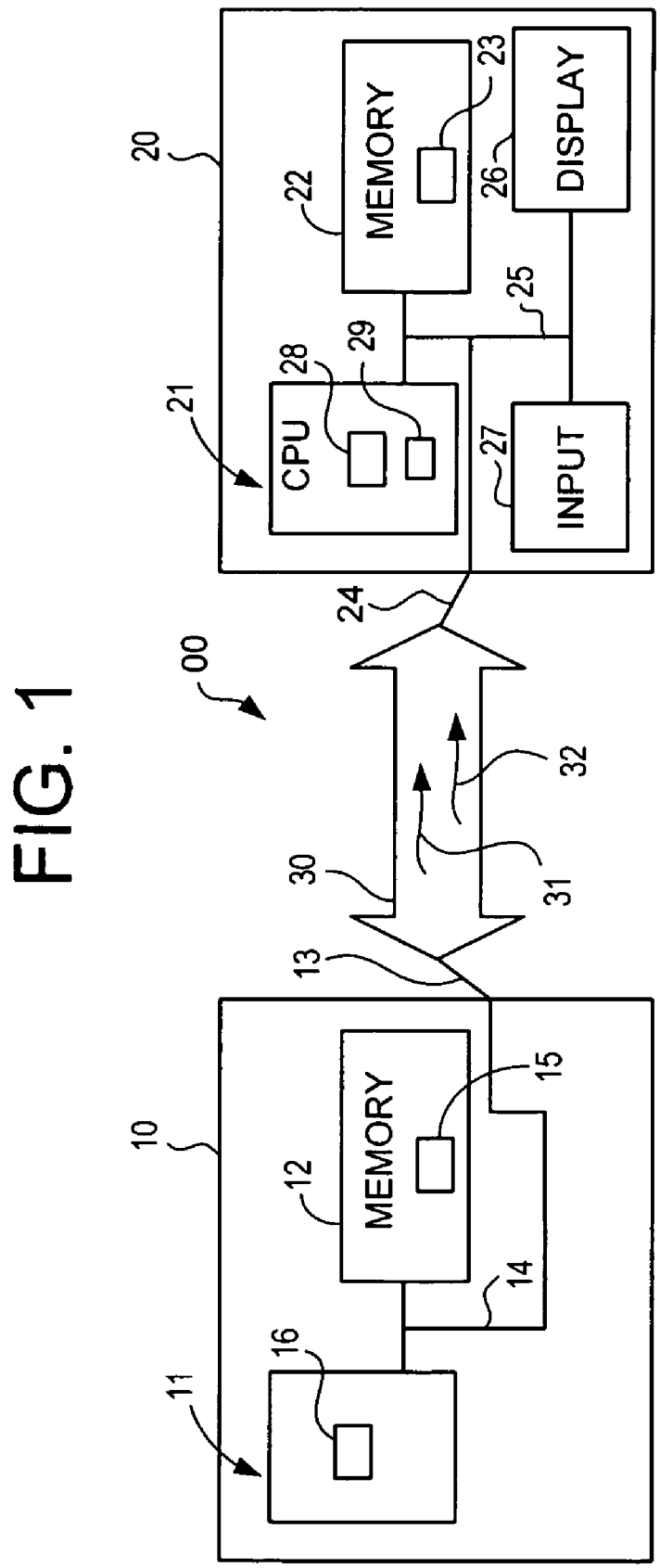
FIG. 1 depicts a data processing system suitable for practicing methods and systems consistent with the present invention.

The following outlines elements of the client 20 and server 10 depicted in FIG. 1, which allow the synchronization of the execution of service calls from different threads at the server 10 and client 20. It is noted that the following example serves for illustration purposes only and does not limit the methods and systems which are consistent with the practice of the present invention. Further examples of the client 20 and server 10 are possible.

The client unit 20 as depicted in FIG. 1 may be a general purpose data processing device, such as a personal computer, a mobile terminal such as a mobile computing device, a mobile phone or a mobile data organizer operated by a user wishing to access a service remote from the client 20, i.e., at the server 10. Even though only a single client 20 is illustrated in FIG. 1, other embodiments may include a plurality of similar client 20 connected to the server 10.

In one embodiment consistent with the present invention, FIG. 1 depicts a client 20 including a client data processing unit (i.e., processor) or processing means 21, which may be a central processing unit of the client 20 or may be a processing unit external to the client 20.

The client processor 21 may have access to a memory 22 or storage means for storing a program 23, and program elements of a distributed application to be executed on the server 10 and the client 20. The memory 22 may be located within the client 20 or external thereto. The client processor 21 is preferably adapted to execute, by program 23, a plurality of service calls of different threads asynchronously, and using the synchronization calls, to replicate a sequence of execution of service calls from different threads at the server 10.

The service calls to be executed at the client processor 21 by program 23, may originate from a plurality of threads which are started by processes, the processes being executed in order to run a distributed application in order to provide a service to a user. Each process generates at least one thread during execution and, the threads of a process may be executed asynchronously, also in order to achieve improved performance.

A distributed operation or service may, for example, be an editing of data files, rendering of data such as web pages, may correspond to mathematical or logical operations on contents of a data file, may relate to home banking applications, spread sheet applications, drawing applications, e-mail applications and the like. The distributed operation may also relate to visualizing a data file, such as a text document, an image file, video data or may relate to playing back audio or audio visual information.

Each of the above described applications may include modules or sub-modules executed at the client 20 and modules or sub-modules executed at the server 10.

The client processor 21 may also include a client call counter 28, or the client call counter 28 may be a commercially available counter for counting events. The client call counter 28 is arranged by program 23 to count the execution of service calls at the client 20.

In order to be able to maintain a synchronization of service call execution at the server unit 10 and the client 20 an agreement has to be reached at the server side and the client side about which type of service calls are counted.

For example, all service calls requiring a communication between the server 10 and the client 20 could be counted, i.e., all service calls which are received from the server 10 at the client 20. However, it is also possible that only a well-defined subset of service calls is counted at the client 20, and, correspondingly at the server 10, in order to reduce the computational requirements to count service calls.

Further, the client call counter 28 may have a defined length, which is selected such that an overtaking of service calls from different threads can securely be detected, i.e., the client call counter 28 may be designed to have a range which is sufficient to count service calls during all possible scenarios where service calls from different threads at the server 10 overtake each other. This may be a maximum count difference between an overtaking call sequence and a regularly executed call sequence.

The client call counter 28 may be a commercially available counter for counting events. However, it is also possible that the functions of the client call counter 28 are executed by a processing unit such as the client processor 21.

The client processor 21 may also include a call handler 29 which handles the execution of service calls at the client 20, or the call handler 29 may be a separate unit which is internal or external to the client 20. The call handler 29, by program 23, manages the execution of service calls of different threads at the client 20 such that a synchronization to the corresponding execution of service calls at the server 10 can be maintained.

The program 23 may allow call handler 29 to place threads of processes started during the execution of the distributed application into a wait position, i.e., if the server call counter value and the client call counter value of a synchronization call of a call sequence corresponding to the thread do not match, as in this case an overtake condition is detected.

Further, the call handler 29 may be arranged by program 23 to resume execution of a particular thread of a process if the thread was placed in a wait position upon a counter value being mismatched. The call handler 29 may, by program 23, preferably initiate resuming a thread if the client call counter value matches the server call counter value included in a synchronization call of a call sequence of the respective thread.

The client 20 may also include a display 26, and an input device 27 as input means.

The communication link 25 connecting the processing unit 21 (and any other separate units such as the call counter 28 or call handler 29), the memory 22, the display 26, and input device 27, may be a system bus 25 for exchanging data between these elements; however, may also include external connections, i.e., connections to the input device 27 or keyboard, or to other data processing devices and the like.

A client communication link 24 may communicate, by program 23, with the server unit 10 using a communication end point specified by an address and a port number. The communication link 24 may be a dedicated communication link such as a mobile communication link or a switched circuit communication link. Further, the communication link may involve a network of data processing devices such as a local area network or a wide area network or combinations thereof. The client communication link 24 may be adapted by program 23 to execute various communication protocols, i.e., communication protocols for remote operations in applications as outlined below. Communications protocols may for example be TCP/IP or any other point-to-point connection.

In the following, the elements of the server 10 will be outlined in further detail. It is noted that this example serves as illustration purposes only and does not limit the methods and systems consistent with the present invention. Further examples of the server 10 are possible.

The server 10 may be a general purpose data processing unit, preferably a data processing unit with large resources, i.e., high processing capabilities and large memories for storing large amounts of data. The server 10 may be a single unit or may be a distributed system of a plurality of servers 10 or data processing units and may be shared by multiple users.

In one embodiment consistent with the present invention, the server data processing unit (i.e., processor) 11 or processing means may be constituted by a central processing unit of the server 10, but may also be constituted by a distributed central processing unit including a plurality of individual processors 11 on one or a plurality of machines. The server data processor 11 may have access to a server memory 12 or storage means for storing preferably a program 15 or a large number of application programs 15 for providing various services to users, i.e., for performing various operations on data files as desired by users operating clients such as the client 20.

The server processor 11 may execute partitions of distributed applications, the execution of which need to be synchronized between the server 10 and the client 20.

The server processor 11 may be arranged to execute, by program 15, tasks of a distributed application asynchronously, i.e., processes started by the respective parts of the distributed application may execute calls of different threads asynchronously, i.e., a call scheduler may be arranged to schedule the execution of service calls at the server 10 as required for providing high performance. Each process generates at least one thread during execution and, the threads of a process may be executed asynchronously, also in order to achieve improved performance.

A MUTEX (Mutually Exclusive) may be provided for supervising, by program 15, the execution of different threads of the processes in order to avoid that data that cannot be shared is accessed by different threads simultaneously. The MUTEX may maintain a proper sequence of service call execution at the server 10, however, the MUTEX is not available at the client 20, i.e., the client 20 has its own scheduler for scheduling the execution of service calls of different threads.

The server processor 11 may include a server call counter 16 which may be a counter similar to the one described with respect to the client 20, for counting the execution of service calls at the server 10. As outlined earlier, in order to allow a synchronization using the server call counter value and the client call counter value, the server call counter 16 and the client call counter 28 should be designed to meet the same requirements, i.e., to count the same type of service call, to have a corresponding length and the like.

Maintaining a reduced size of the client call counter 28 and correspondingly the server call counter 16 reduces the size of a count value and thus reduces the transmission overhead for synchronizing the execution of service calls at the server 10 and the client 20.

The server processor 11 and the memory 12, as well as any other separate units such as the server call counter 16, are connected by a communication link 14, which may be constituted by a system bus or the like, or by external connections, particularly in case the server 10 is constituted by a distributed system included distributed server data processing units and/or distributed server communication units.

The server communication link 13 may correspond to the client communication link 24. However, the server communication link 13 may be adapted, by program 15, to communicate with a plurality of client such as the client unit 20, i.e., to maintain communication links to a plurality of clients 20.

Communications between the server 10 and the client 20 may be carried out through a communication link 30, such as a dedicated communication link, a wireless communication link, or may be established through a communication network such as a local area, company-wide intranet or a wide area network as the Internet. It is also possible that the communication link includes combinations of the above examples.

The client communication link 14 and the server communication link 13 may communicate over the communication link 30 in order to transfer synchronization calls, as indicated by arrow 31 and in order to transmit service calls as indicated by the arrow 32.

However, the communication link 30 may also be used for further communications, including bi-directional communications, particularly if the execution of the distributed application, i.e., the application to be synchronized, requires the transmission of information from the client 20 to the server 10, i.e., in controlling the server 10 during execution of the distributed application. For example, a bi-directional transmission of data may be required if a document is rendered at the server 10 in preparation of displaying the document at the client 20 for editing. In this case commands during editing or preferences such as frame sizes of a display unit 26 need to be transmitted from the client 20 to the server 10, wherein in turn, the server 10 adjusts the parameters for display or correspondingly edits the document.

A distributed application as outlined above with respect to the client 20 and the server 10, may be a visualization application for visualizing information locally at the client 20. In this case the server 10 may be arranged to retrieve the desired document and to render the document in order to prepare frames which can be displayed at the client 20. The rendering may include to adapt a display frame to characteristics of a display unit 26 connected to the client 20, including frame size, color, gray scale and the like. At the client 20 the visualization application may include receiving frames for display, may include further processing of the frames for display and may include displaying the frames on the local display 26 connected to the client 20.

Further, a service application may include editing a document at the client 20, wherein the server 10 may retrieve the document and prepare the document for editing and wherein at the client 20 commands for editing the document are input in order to control the editing process at the server 10. An application may include rendering instructions, for example in converting documents between different formats, an application may relate to storing information either locally at the client 20 or at the server 10, or an application may include mathematical or logical operations executed at the server 10 and the client 20.

During executing the application at the client 20 and the server 10, corresponding processes to realize the functionality of the application may be launched at the client 20 and at the server 10.

In order to achieve high performance, in the client 20 and the server 10 preferably are multitasking systems or systems for parallel processing.

It is noted that the above described features and processing operations may be realized by dedicated hardware or may be realized as programs including code instructions executed on data processing units, i.e., the server 10 and the client 20. It is further possible that parts of the above sequences of operations are carried out in hardware, whereas others of the above processing operations are carried out using software.

Although aspects of one implementation are depicted as being stored in memory, one skilled in the art will appreciate that all or part of systems and methods consistent with the present invention may be stored on or read from other computer-readable media, such as secondary storage devices, like hard disks, floppy disks, and CD-ROM; or other forms of ROM or RAM either currently known or later developed. Further, although specific components of data processing system have been described, one skilled in the art will appreciate that a data processing system suitable for use with methods and systems consistent with the present invention may contain additional or different components.

Methods and systems consistent with the present invention as shown by the embodiment of FIG. 1, and as discussed with respect to the steps depicted in FIG. 2a (discussed later), allows the synchronization of the execution of service calls from different threads at the server 10 and the client 20.

Previously, one approach to synchronize the execution of calls of different threads at the server 10 and the client 20 could be to provide each call to be transmitted from the server 10 to the client 20 with a unique identifier specifying a sequence number of execution of the respective call at the server processor 11. However, this approach leads to a large communication overhead, since each call is transmitted in association with the unique identifier.

Therefore, according to methods and systems consistent with one embodiment of the present invention as shown in FIG. 1 and depicted in the steps of FIG. 2a, each time a thread change takes place at the server 10, a synchronization message is generated which is transmitted to the client 20. Using the synchronization calls, the client 20 may replicate the sequence of execution of the service calls from different threads at the server 10, in order to correctly carry out a service application.

According to the embodiment, at the server 10, the program 15, as transmitting means, allows the server communication link 13 to transmit service calls generated by a plurality of threads at the server 10, to the client 20.

The program 15 directs the server processor 11 to generate a synchronization call, as generation means, when a thread executed at the server 10 changes, indicating a number of service calls generated by threads at the server 10 prior to the thread change, and the server communication link 13 transmits the synchronization call to the client 20.

At the client 20, the client communication link 14, as receiving means, receives the service calls generated by the plurality of threads executed at the server 10 and receives the synchronization call from the server 10.

The program 23, as placing means, then makes the call handler 29 at the client 20 place at least one service call associated with the synchronization call into a wait position, if the number indicated in the synchronization call and a number of service calls executed at the client 20 prior to receiving the synchronization call differ.

Thus, each time a thread change takes place at the server 10, the program 15 initiates a synchronization call which is transmitted to the client 20. Using the synchronization call indicating that a thread executed at the server 10 has changed the client 20, suitably places corresponding service calls into a wait position, to maintain a correct sequence of execution of the service calls from different threads at the client 20, in correspondence to the execution at the server 10, in order to correctly carry out a service application.

In this embodiment, the client 20 does not necessarily include a client call counter 28 and the client processor 21, and the server 10 does not necessarily include the server call counter 16.

In another embodiment consistent with the present invention, and also described with FIG. 1 as an illustrative example, the server processor 11 of the server unit 10 is adapted to receive a current service call from a first thread executed at the server 10. Then the program 15 determines a first thread ID (identifier) of the first thread and compares the first thread ID with a second thread ID of a second thread executed at the server 10, which issued a service call preceding the current service call. In case the first thread ID and the second thread ID differ, the server processor 11 may generate a first synchronization call including a server call counter value indicating a number of service calls executed at the server 10 prior to the current service call. A server call counter value stored in the server call counter 16 is incremented to count the current service call.

By repeating the above described operation for service calls executed at the server 10, each time a thread changes, the program issues a synchronization call containing a number of service calls already executed at the server 10.

The program 15 then directs the server communication unit 13 to transmit the executed service calls and the synchronization calls to the client 20, to enable the client 20 to synchronize the execution of the service calls from the plurality of threads at the server 10.

At the client 20, the client communication link 24 receives a call sequence of a plurality of call sequences from the server 10. The call sequence may be a packet of at least one service call and at least one synchronization call transmitted from the server 10, however, service calls and synchronization calls may also be received at the client 20 in an arbitrary order and the program 23 may have the client communication link 24 arrange the received service calls and synchronization calls into call sequences.

A call sequence initiated by the server program 15 includes a first synchronization call and at least one service call from a first thread executed at the server 10, the first synchronization call including a first server call counter value indicating the number of service calls executed at the server 10 prior to the first synchronization call and the service calls of the first thread.

The program 23 initiates a comparison of the first server call counter value and a client call counter value by the client processor 21. The client call counter value indicates a number of service calls executed at the client 20 prior to receiving the first synchronization call. The client call counter value of the client call counter 28 is incremented to count executed service calls.

Since the client call counter 28 and the server call counter 16 count the execution of service calls at the client 20 and server 10, respectively, the service calls from different threads at the client 20 and at the server 10 are known to be in the same and correct sequence, if the server call counter value and the client call counter value coincide.

The programs 15, 23 may direct the server call counter 16 and the client call counter 28 to count a total number of calls at the server 10 and the client 20, respectively, or a total number of calls requiring communication between the server 10 and the client 20 or the like. The length of the server call counter 16 and the client call counter 28 may preferably be adapted such that an unambiguous replication of the sequence of service calls at the client 20 is possible.

If it is determined by the program 23 that the client call counter value and the first server call counter value differ, the program 23 makes the call handler 29 of the client 20 place the first call sequence into a wait position.

The program 23 placing the call sequence associated with a synchronization call having a counter value not corresponding to the client call counter value into a wait position, avoids the situation that a call sequence, having overtaken another call sequence from a different thread at the server 10, is executed at the client 20 prior to the call sequence from the server 10 which was overtaken. In other words, the program 23 at the client 20 may postpone the execution of a call sequence until the correct client call counter value, i.e., the client call counter value corresponding to the server call counter value of the corresponding synchronization call, is reached at the client 20.

Even though for a synchronization of the execution of service calls at the client 20 to the execution of service calls at the server 10 mainly requires a transmission of data from the server 10 to the client 20 (i.e., the synchronization calls, as indicated by an arrow 31 in FIG. 1, and service calls as indicated by an arrow 32 in FIG. 1), the client 20 and the server 10 may be involved in a bidirectional communication, i.e., for controlling the execution of a distributed application such as visualization of documents, editing, printing, storing and the like.

Even though in the above described scenarios the execution of a sequence of service calls issued by different threads at the server 10 is served in synchronization thereto by corresponding threads at the client 20, in another embodiment, the execution of a sequence of service calls issued by different threads at the client 20 could be served in synchronization thereto by corresponding threads at the server 10.

Further, embodiments are possible wherein a sequence of service calls at the server 10 is synchronized at the client 20 and vice versa, concurrently a sequence of service calls issued at the client 20 are synchronized at the server 10.

In the following, as discussed above with respect to FIG. 1, one embodiment consistent with the present invention will be described with respect to the flowchart of FIG. 2a.

FIG. 2a depicts the methods and systems consistent with the embodiment of the present invention discussed above with respect to FIG. 1, for synchronizing service calls at a client 20 and a server 10. On the left side of FIG. 2a steps executed at the server 10 are illustrated, and on the right side steps performed at the client 20 are shown. However, the steps of FIG. 2a are not limited to the system of FIG. 1.

First, steps at the server 10 will be described.

In step S201, the program 15 transmits service calls generated by a plurality of threads at the server, such as the server 10 of FIG. 1, to the client 20. The service calls may be generated by the threads as outlined with respect to FIG. 1, i.e., under control of a scheduler, scheduling the execution of threads at the server 10.

In step S202, the program 15 generates a synchronization call when a thread executed at the server 10 changes, i.e., when a thread currently placing a call is no longer placing calls, but another thread starts placing calls at the server 10. The synchronization call indicates a number of service calls generated by threads at the server 10 prior to the thread change. Thus, the synchronization call includes information on the service call execution at the server 10.

In step S203, the program 15 transmits the synchronization call to the client 20, i.e., as outlined previously.

Accordingly, the program 15 at the server 10 generates synchronization calls each time a thread change occurs at the server 10 and transmits the synchronization call to the client 20, in order to allow the client 20 to synchronize a service call execution.

Now the steps at the client 20 will be described.

In step S204, the program 23 at the client, such as the client 20 of FIG. 1, receives the service calls and the synchronization call, indicating that a thread executed at the server, such as the server 10, for example, as outlined with respect to FIG. 1, has been changed.

Then, in step S205 the program 23 at the client 20 places at least one service call associated with the synchronization call into a wait position, if the number indicated in the synchronization call and a number of service calls executed at the client 20 prior to receiving the synchronization call differ.

Thus, the program 23 at the client 20 places service calls associated with a synchronization call into a wait position, if a number of service calls executed at the server 10 and a number of service calls executed at the client 20 differ from each other, as in this case, where it is indicated that the service calls associated with the synchronization call overtook other service calls executed at the server 10.

A service call may be associated with a synchronization call, for example, by the programs 15 or 23 including respective identifiers into the synchronization call and/or service calls, or by a specific reception sequence of service calls and synchronization calls at the client 20 or by similar means.

The above outlined steps advantageously allow the program 23 to place service calls associated with a synchronization call into a wait position, i.e., by placing a corresponding thread at the client 20 into a halt condition, in order to avoid that a service call execution at the client 20 is not synchronized with a service call execution at the server 10.

Since only upon an occurrence of a thread change a synchronization call is generated and transmitted to the client 20, a reduced communication overhead may be achieved.

Methods and systems consistent with one embodiment of the present invention as depicted in FIG. 2b, and discussed above with respect to FIG. 1, illustrate the steps in synchronizing service calls at a client 20 and a server 10. On the left side of FIG. 2b, the steps executed at the server 10 are depicted, and on the right side the steps executed at the client 20 are depicted. However, the steps of FIG. 2b are not limited to the system shown in FIG. 1.

In the following, the steps at the server 10 will be outlined in detail.

In a first step S251, at the server 10, service call instructions are received by the program 15. The service call instructions may be generated by different threads of, i.e., a process executed at a server processor 11, and the program 15 may instruct the server 10 to transmit data, requests, instructions or similar to the client 20.

The service calls may be generated by the program 15 asynchronously, i.e., multithreading or parallel processing may be available.

Usually, a thread will generate a certain sequence of service calls by the program 15, and then, for example, controlled by a call scheduler, another thread will generate a sequence of service calls. Since the order of execution of the call sequences from different threads by the server side program 15 is not a fixed one, call sequences from different threads may overtake each other on the client side. There are two possible situations where overtaking can occur. It is possible that call sequences overtake each other during transmission to the client 20. However, it is also possible that service calls or call sequences overtake each other on the client side due to the fact that the client side scheduler can execute threads in a different order than on the server side. The client side scheduler is not aware of the server side scheduler.

In step S252, the program 15 determines whether a thread change has occurred, i.e., whether after issuing at least one service call from a first thread, a second thread issues at least one service call. A thread change may be detected by the program 15 by obtaining the thread IDs (identifiers) of threads issuing respective service calls, and in case the thread ID changed, a thread change is indicated.

In step S253, if the program 15 determines there was a thread change in step S252, a synchronization call is generated by the program 15, at least including the server call counter value. Since the server call counter value is used before it is incremented, the server call counter value will indicate the number of service calls before the occurrence of a synchronization call, i.e., a thread change. The synchronization call may include further information, such as an identifier of the new thread, i.e., the thread starting to operate.

In step S254, a server call counter, such as server call counter 16 of FIG. 1, is directed by the program 15 to increment and count the service calls at the server 10. For example, the server call counter 16 can be incremented for each server call, for each server call requiring communication with the client 20, or for other defined call types.

In step S255, the program 15 transmits the synchronization call and the service calls to the client 20. Preferably, a synchronization call will be associated with service calls occurring at the server 10 after the synchronization call until the next thread change occurs. Thus, the synchronization call containing the server call counter value may be associated with calls which are to be executed at the client 20 after a corresponding client call counter value was reached.

In the following, the steps performed at the client 20 will be described in detail.

In step S256, the program 23 receives the synchronization call and the service calls at the client 20. The synchronization call and the service calls may be arranged into call sequences including a synchronization call and at least one service call from a particular thread. Transmission characteristics of synchronization calls and service calls will be described with respect to further embodiments consistent with the present invention, of further Figs.

In step S257, the program 23 compares the server call counter value included in the synchronization call of the call sequence and a client call counter value, to determine an overtake condition, as outlined previously.

The client call counter value indicates a number of service calls executed at the client 20, preferably prior to receiving the synchronization call, in order to correspond to the server call counter value upon detecting the thread change. Since the counting conditions for counting service calls at the client 20 and the server 10 preferably are the same, the client call counter value will indicate the number of service calls executed at the client 20 corresponding to the number of service calls executed at the server 10 before generating the synchronization message. Therefore, as long as call sequences did not overtake each other, the counter values will correspond, and no action is required as call execution is synchronized.

However, if the server call counter value and the client call counter value differ, an overtake condition is indicated, i.e., a call sequence overtook another call sequence. In particular, if the server call counter value of a current call sequence is larger than the client call counter value, at least one call sequence was overtaken by the considered call sequence.

In accordance with the above, in step S258, the program 23 determines whether the server call counter value and the current client call counter value coincide and if the decision is "YES", in step S259, the service calls of the call sequence are executed and counted. Since the service calls are counted, the current counter value at the client 20 will indicate the same number of executed service calls.

On the other hand, if in step S258 the decision is "NO", indicating that the counter values differ, in step S260, the current call sequence is placed into a wait position, as an overtake condition is present.

After steps S259 and S260, the flow of steps returns to step S256 and a subsequent call sequence can be considered by the program 23. Call sequences may be processed by the program 23, as above in the order they were received at the client 20. However, as the synchronization calls establish the correct sequence of execution at the client 20, i.e., the same sequence of execution as before at the server 10, the call sequences may be processed by the program 23 in an arbitrary order.

The correct sequence of service calls at the client 20 is only maintained as long as the server call counter value of a synchronization call corresponds to a current client call counter value, and a call sequence with a synchronization call which does not correspond to a current client call counter value, is placed into a wait position until the current client call counter value reaches the server call counter value of the synchronization call. During this period, call sequences with matching counter values will be processed and counted by the program 23.

Accordingly, since call sequences are suitably placed into wait conditions by the program 23 if other call sequences were overtaken, since only upon thread changes synchronization calls are transmitted between the server 10 and the client 20, a communication overhead for maintaining a synchronization of service call execution at the client 20 and at the server 10 can be minimized.

Even though the steps of FIG. 2b are shown in a particular sequence, other embodiments consistent with the present invention may show other sequences or steps for maintaining a synchronization of service call execution at the client 20 and server 10.

In the following, another embodiment consistent with the present invention will be described with respect to FIG. 3.

Figure 3:
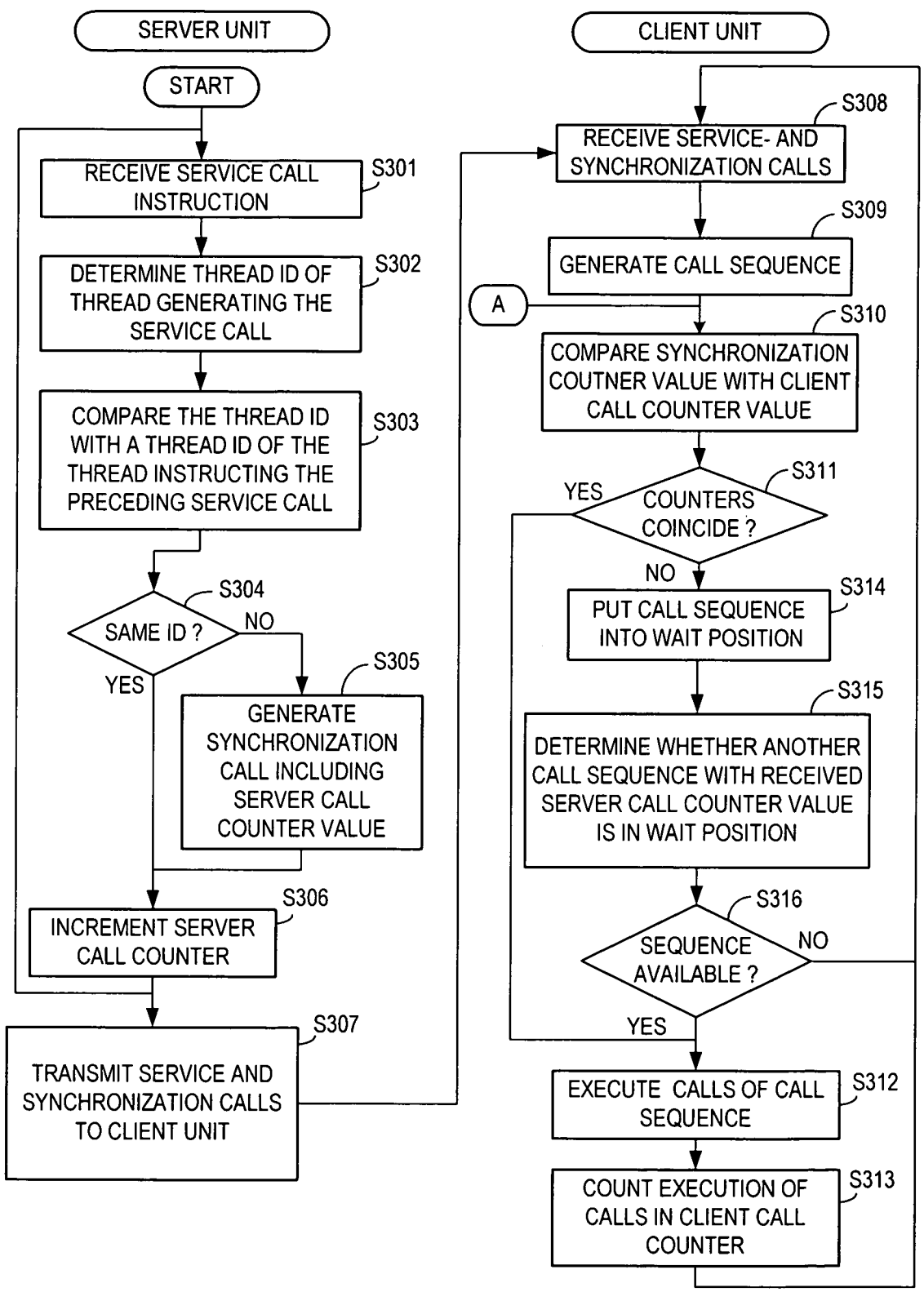
FIG. 3 depicts a flowchart of the steps performed by the program depicted in FIG. 1 according to another embodiment in accordance with methods and systems consistent with the present invention.

FIG. 3 shows steps at a server 10 and a client 20 for synchronizing calls according to another embodiment consistent with the present invention, particularly outlining further steps for determining an overtake condition at the server 10, and with regard to the execution of call sequences at the client 20. The steps depicted in FIG. 3 may be executed using the system of FIG. 1, however, FIG. 3 is not limited thereto.

On the left side of FIG. 3, steps at the server 10 are depicted, and on the right side, steps at the client 20 are depicted.

First, the steps at the server 10 will be outlined in detail.

In step S301, a service call instruction is received at the server 10 by program 15, for example, as outlined with respect to step S251 of FIG. 2b described previously.

In steps S302, the program 15 determines a thread ID (identifier) of the thread generating the received service call. The thread ID of a thread generating the current service call may be provided by a server call scheduler or by any other means keeping track of the execution of service calls from different threads.

In step S303, the program 15 compares the thread ID of the thread generating the current service call with a thread ID of a thread which has issued a preceding service call, in order to determine whether the service calls originate from different threads.

In step S304, the program 15 determines whether the thread IDs are the same. If the decision is "NO", a synchronization call is generated, including the current server call counter value, i.e., indicating a number of service calls executed at the server 10 prior to the thread change. The synchronization call may be generated as outlined with respect to previous embodiments.

If in step S304 the decision is "YES", indicating that a thread change did not take place, in step S306, the program 15 increments the server call counter in order to count the received service call instruction. Thereafter the program 15 returns the sequence to step S301 and the next service call instruction is received by the program 15.

Figure 4:
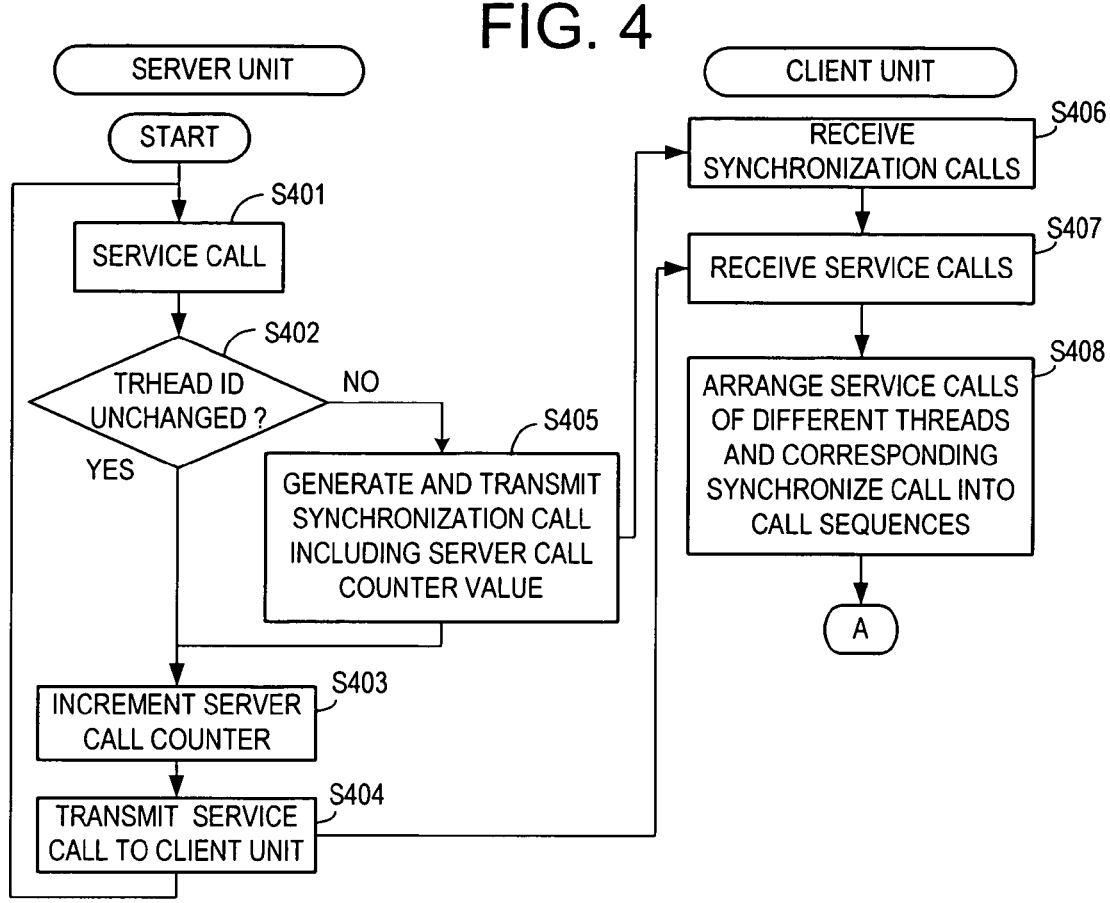
FIG. 4 depicts a flowchart of the steps performed by the program depicted in FIG. 1 according to another embodiment in accordance with methods and systems consistent with the present invention.
Figure 5:
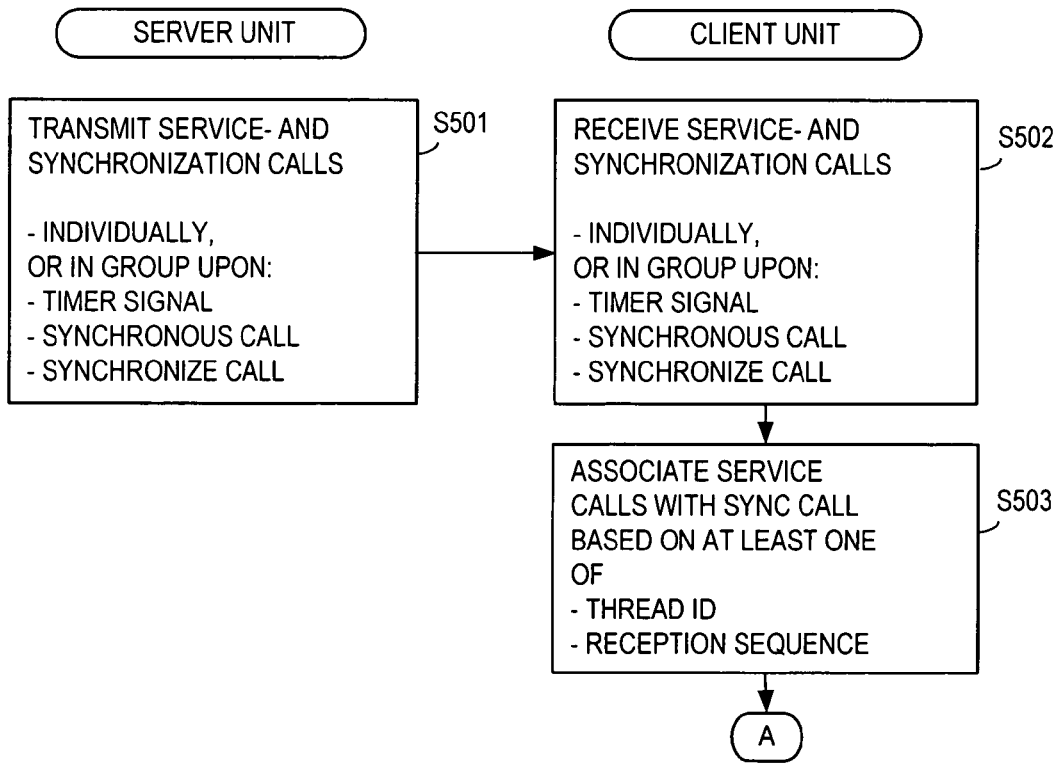
FIG. 5 depicts a flowchart of the steps performed by the program depicted in FIG. 1 according to another embodiment in accordance with methods and systems consistent with the present invention.

In step S307, following step S306, the program 15 transmits the service calls and the synchronization calls to the client 20, either sequentially upon a generation or from time to time in groups transmitted upon occurrence of a synchronization call, a synchronous call at the server 10 or a timer signal, as will be outlined with respect to the embodiments consistent with the present invention and depicted in FIGS. 4 and 5.

In the following, the steps at the client 20 are outlined in detail.

In step S308, the program 23 receives the service calls and synchronization calls from the server 10 via a communication link such as communication link 30 of FIG. 1. As outlined previously, the service calls may be received upon a timer signal, a synchronous call, a synchronization call or in an arbitrary order, as will be outlined with respect to the embodiments consistent with the present invention which are depicted in FIGS. 4 and 5.

If the service calls and synchronization call are not already arranged in call sequences, i.e., by the program 15 at the server 10, upon receiving the service calls and synchronization calls, the program 23 at the client 20 generates in step S309 call sequences, each call sequence including a synchronization call and at least one service call from a particular thread. To facilitate generating call sequences, the synchronization call by the program 23 may include a thread ID of the thread which generated the associated service calls of the call sequence and the service calls may include a thread ID of the thread which generated the service call.

Each call sequence preferably includes a synchronization call and service calls which are to be executed at the client 20 after the client counter value has reached the server call counter value included in the synchronization call.

In step S310, the program 23 compares the synchronization counter value with the current client call counter value in order to determine whether an overtake condition has occurred. Step S310 may correspond to step S257 of FIG. 2b.

In step S311, the program 23 determines whether the counters coincide and if the decision is "YES", the program 23 indicates that the correct sequence of service calls is presently scheduled for execution and thus, in step S312, the calls of the call sequence are executed and in step S313, the calls are counted in the client call counter in order to maintain a correct counter value. After step S313, the flow returns to step S308.

If in step S311 the decision is "NO", indicating that the call sequence overtook at least one other call sequence, in step S314, the call sequence is placed into a wait position by the program 23. A wait condition may be achieved by halting the execution of a particular thread. Nevertheless, the service calls of the call sequence may be associated with the corresponding thread, but the program 23 will not allow the thread to execute any service call as long as the halt condition continues. For example, the service calls of the call sequence may be placed into a call buffer by the program 23 and may be maintained in the call buffer as long as the call sequence and thus, the thread is in the wait position.

In step S315, the program 23 determines whether another call sequence is available having a synchronization call with a server call counter value corresponding to the current client call counter value and being in a wait position. This may be achieved by the program 23 interrogating the status of threads at the client 20 in order to determine whether a particular thread and call sequence is in a wait position.

In step S316, the program 23 determines whether such a call sequence is available. If in step S316, the decision is "NO", the program returns the sequence to step S318, i.e., the client 20 waits to receive further service and synchronization calls. In this condition, the client 20 may be in a waiting condition waiting for another call sequence to be received from the program 15 at the server 10, wherein this call sequence includes a synchronization call including a server call counter value coinciding with the current client call counter value. Nevertheless, further operations or processes may be carried out at the client 20 during this period.

If in step S316 the decision is "YES", indicating that a call sequence with the correct server call counter value is available, the program 23 continues the steps to step S312 and the calls of the call sequence are executed by the program 23 and the execution of the calls is counted in the client call counter in step S313. Thereafter the program 23 returns the sequence to step S308, as outlined before.

The above outlined operations advantageously allow the placement of call sequences into wait positions until the current value of the client call counter coincides with the server call counter value included in the call sequence, in order to maintain a correct sequence of execution of call sequences.

Further, since only upon the occurrence of a thread change a synchronization call is generated by the program 15 and transmitted to the client 20, a reduced communication overhead may be achieved while maintaining a synchronization of service call execution between the client 20 and the server 10.

Even though the operations of FIG. 3 are shown in a particular sequence, other embodiments consistent with the present invention may show other sequences of operations for maintaining a synchronization of service call execution at the client 20 and server 10.

It is noted that in further embodiments consistent with the present invention, synchronization calls may not only be generated by the program 15 at the server 10 upon the occurrence of a thread change at the server 10. For example, synchronization calls could be generated by the program 15 from time to time upon a timer signal generated by a timer at the server 10. Further, a synchronization call could be generated by the program 15 after a predetermined number of service calls at the server 10 or, a synchronization call could be further generated by the program 15 upon a synchronous call occurring at the server 10.

Transmitting further synchronization calls from the server 10 to the client 20 by the program 15 may advantageously improve a robustness of the client and server system in achieving a synchronization of service call execution at the server 10 and client 20.

In the following a further embodiment consistent with the present invention will be described with respect to FIG. 4.

FIG. 4 shows operations at a server 10 and a client 20 for synchronizing a service call execution at the server 10 and client 20 according to another embodiment consistent with the present invention. FIG. 4 particularly outlines a transmission scheme of synchronization calls and service calls at the server 10, and a scheme for receiving and arranging the synchronization calls and service calls at the client 20. The operations shown in FIG. 4 may be carried out using the system shown in FIG. 1, however, FIG. 4 is not limited thereto.

First, the steps at the server 10 will be described in detail.

In a first step S401, a service call is received at the server 10, for example as outlined with respect to previous embodiments.

In step S402, the program 15 determines whether a thread ID has remained unchanged. If in step S402 the decision is "YES", in step S403 a server call counter 16 is incremented, for example as outlined with respect to previous embodiments consistent with the present invention.

In step S404, the service call is transmitted to the client 20. The service call may be transmitted over a communication link such as the communication link 30 shown in FIG. 1.

Thereafter the flow of operations returns to operation S401 and another service call is received.

If in step S402 the decision is "NO", indicating that the thread ID changed, in step S405, the program 15 generates a synchronization call, at least including the server call counter value, i.e., the server call counter value prior to the thread change. Further, the synchronization call may include information on a thread responsible for the thread change and/or may include information on calls to be executed by the thread indicated in the synchronization call.

In the following, the steps at the client 20 will be described in detail.

In step S406 at the client 20, synchronization calls transmitted by the program 15 are received from the server 10, for example, as outlined with respect to the previous embodiments consistent with the present invention. The received synchronization calls are preferably intermediately stored in a buffer.

In step S407, service calls generated by the program 15 are received at the client 20 from the server 10. The service calls may include information on a thread which generated the service call and may include further information allowing to synchronize an execution of service calls within a particular thread.

In step S408, since the synchronization calls and service calls are received in a sequence, the service calls of different threads and corresponding synchronization calls are partitioned by the program 23 into call sequences. A call sequence preferably includes a synchronization call, i.e., indicating a thread initiating the thread change and service calls relating to this particular thread until the next synchronization call indicating the next thread change is detected.

Thus, service calls are grouped in association with one synchronization call including a server call counter value executing the call sequences in a correct order at the client 20. After step S408, the sequence may continue at an entry point A shown in FIG. 3, i.e., the sequence of steps may continue with step S310 of FIG. 3.

The steps outlined above advantageously arrange service calls in association with synchronization calls into call sequences for handling at the client 20.

Even though the steps of FIG. 4 are shown in a particular sequence, other embodiments consistent with the present invention may show other sequences of steps for maintaining a synchronization of service call execution at the client 20 and server 10.

In the following, a further embodiment consistent with the present invention will be described with respect to FIG. 5.

FIG. 5 shows steps for synchronizing a service call execution at a client 20 and at a server 10, particularly outlining transmission characteristics of synchronization calls and service calls from the server 10 to the client 20 according to a further embodiment consistent with the present invention.

The steps of FIG. 5 may be carried out using the system of FIG. 1, however, FIG. 5 is not limited thereto.

Initially step S501 occurring at the server 10 will be described in detail.

In step S501, the service calls and synchronization calls generated by the program 15 are transmitted to the client 20. The service calls and synchronization calls may be transmitted individually, as it was for example outlined with respect to FIG. 4, or may be transmitted in groups, by the program 15. The groups may be included into packets of variable or fixed length for transmission through a communication link 30 to the client 20.

A group of synchronization calls and/or synchronization calls may be generated at the server 10 by program 15 upon a timer signal, for example, occurring every 10 ms or any other time period. Thus, the packet of calls may include only service calls if no thread change occurred or may include service calls and one or a plurality of synchronization calls, depending on the number of thread changes.

Further, a packet of service and/or synchronization calls may be transmitted by the program 15 to the client 10 upon the occurrence of a synchronous call at the server 20, i.e., a call which is executed in a synchronous mode at the server 20. Since synchronous calls may occur at arbitrary instances in time, a packet generated upon a synchronous call may have variable length and include only service calls or additionally synchronization calls.

Further, a packet of calls may be generated by the program 15 upon the occurrence of a synchronization call, i.e., a packet will include one synchronization call and one or a plurality of service calls of a particular thread, as outlined previously.

In the following, the steps at the client 20 will be described in detail.

In step S502, the service and synchronization calls generated by the program 15 are received at the client 10. The calls may be received individually, for example as described with respect to FIG. 4, or may be received in correspondence to the step S501 upon the generation of a timer signal, a synchronous call or a synchronized call.

In case of a call packet upon a timer signal, and a synchronous call, the packet may include a plurality of service calls from different threads and a plurality of synchronization calls.

Therefore, in step S503, the service calls included in a packet or received individually need to be associated with a synchronization call. This may be achieved based on at least one of a thread identifier included in a service call and/or a synchronization call, or may be determined upon a reception sequence or an order of service calls and call sequences within a particular packet.

Thereafter, the sequence may continue with entry point A of FIG. 3, i.e., the sequence may continue with step S310 of FIG. 3.

The steps outlined with respect to FIG. 5 allow further flexibility in transmitting service calls and synchronization calls from the server 10 to the client 20, thus further reducing communication requirements.

In the following a further embodiment consistent with the present invention will be described with respect to FIG. 6.

Figure 6:
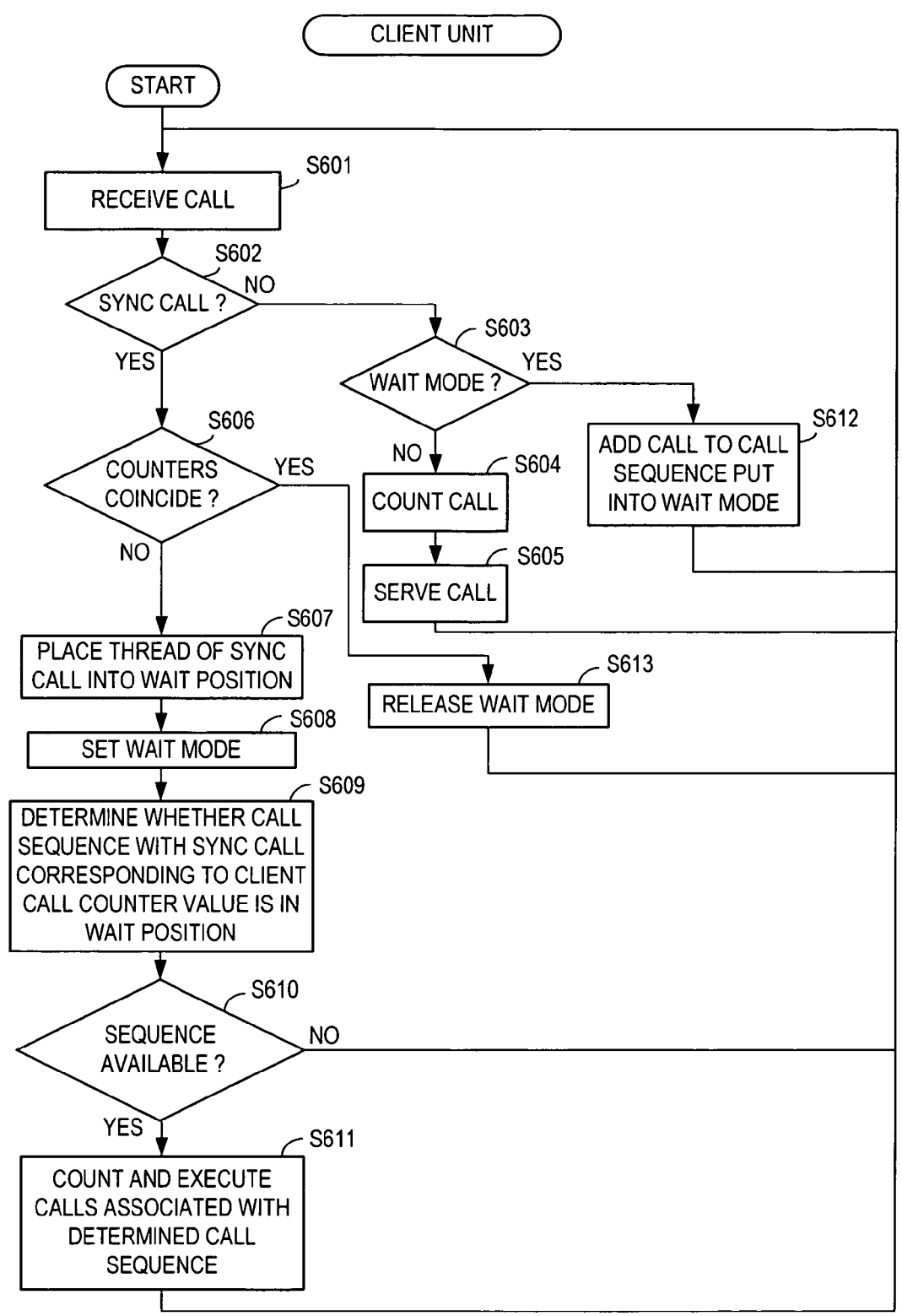
FIG. 6 depicts a flowchart of the steps performed by the program depicted in FIG. 1 according to another embodiment in accordance with methods and systems consistent with the present invention.

FIG. 6 depicts the steps for synchronizing call execution at a server 10 and at a client 20, particularly outlining operations performed at a client 20. The steps of FIG. 6 may be carried out by the system shown in FIG. 1, however, FIG. 6 is not limited thereto.

In step S601, a call transmitted by the server 10 is received at the client 20. Receiving a call may include directly receiving a call from the server 10 or may include handling a call of a number of calls, for example placed into a call sequence as outlined with respect to FIGS. 4 and 5.

In step S602, the program 23 determines whether the call is a synchronization call. If in step S602 the decision is "NO", indicating that a regular service call is under consideration, the program 23 determines in step S603 whether the system is in a wait mode (see step S608, as outlined below).

If in step S603 the decision is "NO", indicating that the system is not in a wait mode, the program 23 counts the service call in step S604 and the service call is served in step S605, for example as outlined with respect to previous embodiments consistent with the present invention.

Serving the call may include displaying information, storing information, printing information or processing information.

After step S605, the sequence returns to step S601 to continue with counting and processing service calls.

If in step S602 the program 23 determines the decision is "YES", indicating that a synchronization call is under consideration, in step S606 the program 23 determines whether a server call counter value and a current client call counter value coincide. The server call counter value and the client call counter value are preferably determined as outlined with respect to previous embodiments consistent with the present invention.

If in step S606 the program 23 determines the decision is "NO", indicating that an overtake condition has occurred, i.e., service calls from a first thread were passed by service calls from a second thread, in step S607 the thread associated with the synchronization call is placed into a wait position, for example as outlined with respect to previous embodiments consistent with the present invention.

Thereafter, in step S608 the program 23 places the system into a wait mode, indicating that all calls received in a sequence of calls will not be executed directly but will be placed into a wait position, for example buffered in a buffer in association with a corresponding thread.

Thereafter, in step S609 the program 23 determines whether another call sequence with a synchronization call including a server call counter value corresponding to the current client call counter value is in a wait position, i.e., whether a corresponding thread was halted.

In step S610 the program 23 determines whether such a call sequence is available, i.e., whether a corresponding thread in a halt position is available. If in step S610 the decision is "NO", the sequence returns to step S601 and the next call is considered.

If in step S610 the program 23 determines the decision is "YES", indicating that a thread is in a wait position with a call sequence in a wait position having a synchronization call with a server call counter value corresponding to the current client call counter value, in step S611, the calls associated with the determined call sequence are executed within the thread at the client 20. Further, the calls are counted in order to maintain a correct client call counter value.

Thereafter the sequence returns to step S601 and a new call is considered.

If in step S603 the program 23 determines that the system is in the wait mode (see step S608), i.e., the decision is "YES" in step S603, the received call is added to the call sequence which was put into the wait mode, for example, stored in a buffer in association with a corresponding thread. Thereafter the flow returns to step S601 and the next call is received.

Further, if in step S606 the program 23 determines that the counters 16, 28 coincide, i.e., that an overtake condition did not occur, the wait mode is released in step S613 and the received call and further received calls can be executed and counted, since a correct synchronization between the client 20 and the server 10 is achieved. The steps outlined with respect to FIG. 6 place threads and call sequences into wait positions and resume execution of threads and call sequences to maintain a synchronization of a call execution at the client 20 and the server 10.

Even though the operations of FIG. 6 are shown in a particular sequence, other embodiments consistent with the present invention may show other sequences of steps for maintaining a synchronization of service call execution at the client 20 and the server 10.

In the following a further embodiment consistent with the present invention will be described with respect to FIG. 7.

Figure 7:
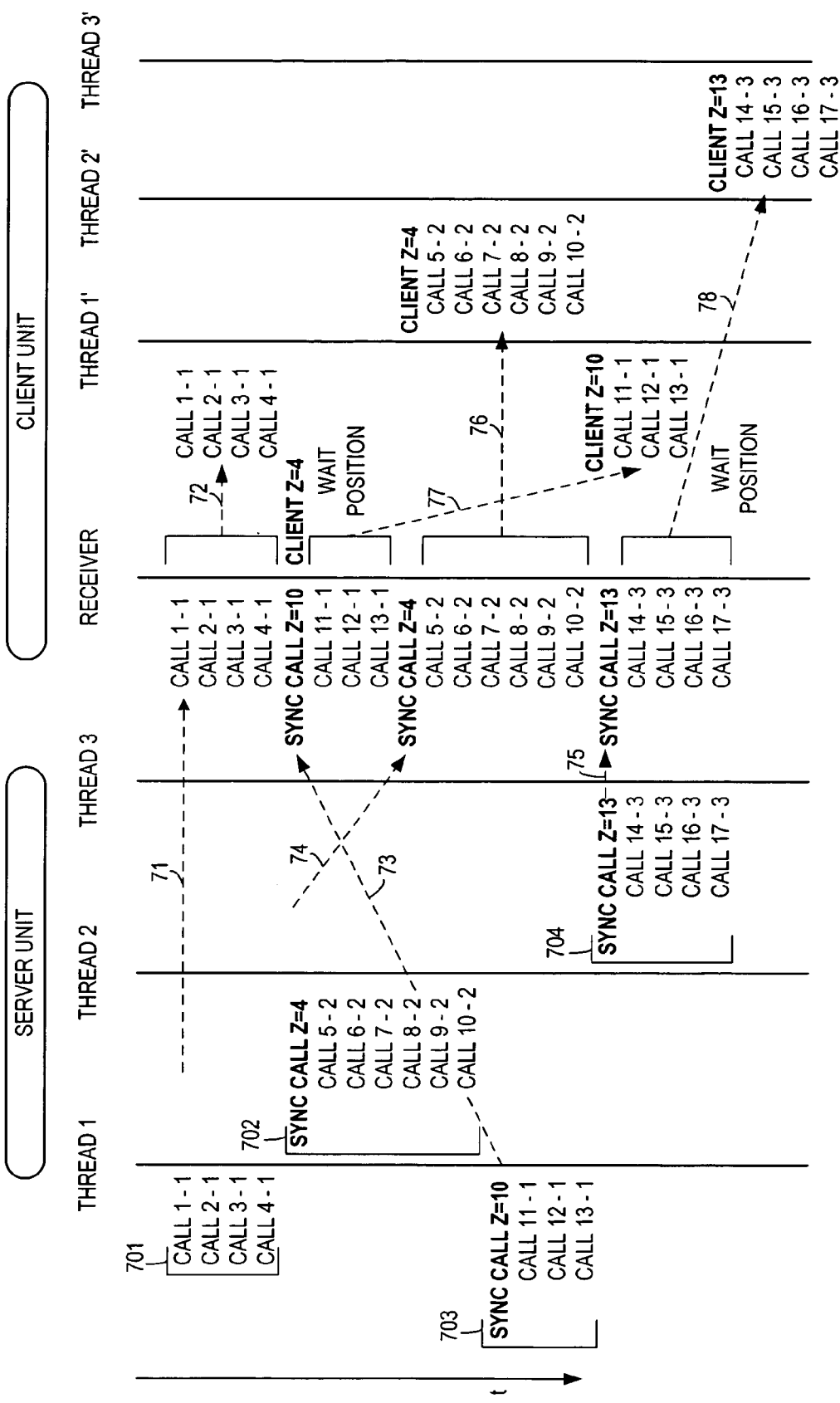
FIG. 7 depicts a flowchart of the steps performed by the program depicted in FIG. 1 according to another embodiment in accordance with methods and systems consistent with the present invention.

FIG. 7 shows an example of call sequences being executed at a server 10 and at a client 20. The call sequence may be executed using the system of FIG. 1, however, FIG. 1 is not limited thereto.

On the left side of FIG. 7, a thread execution at the server 10 is depicted, including the execution of three threads, thread 1, thread 2 and thread 3. In a vertical downward direction a time sequence of calls is outlined.

On the right side of FIG. 7, the execution of threads thread 1', thread 2', thread 3' is depicted being executed at the client 20, and further, a receiver, for example a receiver buffer at the client 20 is illustrated. Time evolves along downward vertical direction.

Initially at the server 10, a thread 1 initiates the program 15 to place a first call sequence 701, including a service call 1-1, a service call 2-1, a service call 3-1 and a service call 4-1.

After call 4-1 a thread change occurs and thread 2 initiates the program 15 to place a second call sequence 702, including service calls 5-2, 6-2, 7-2, 8-2, 9-2 and 10-2.

Since prior to the call change from thread 1 to thread 2 four calls were executed, i.e., four calls of thread 1, a synchronization call with a service call counter value equal to 4, will be generated.

After the second call sequence again, a thread change occurs at the server 10 leading to the program 15 generating a synchronization call with a service call counter value equal to 10, subsequent to which thread 1 places a third call sequence 703 including service calls 11-1, 12-1 and 13-1.

Thereafter another thread change occurs, a third thread, thread 3, initiates the program 15 to place a fourth call sequence 704 including calls 14-3, 15-3, 16-3 and 17-3. Prior to these calls of the fourth call sequence, a synchronization call with a service call counter value equal to 13 will be generated.

In the following, the exemplary sequence of reception of call sequences at the receiver buffer of the client 20 is described.

In the present example of FIG. 7, the first call sequence 701 is received by the program 23 as a first call sequence, as indicated by an arrow 71. As indicated by an arrow 73 at the receiver buffer of the client 20, the third call sequence 703 is received by the program 23 after the first call sequence 701 and prior to the second call sequence 702, indicated by an arrow 74. Thereafter the fourth call sequence 704 is received at the receiver buffer by the program 23, as indicated by an arrow 75.

In accordance with this example of received call sequences at the receiver buffer the following steps now take place.

Since initially all counter values are zero, and a synchronization call did not occur, the service calls 1-1 to 4-1 of the first call sequence 701 may be directly executed in a first thread at the client 20, thread 1', corresponding to thread 1 at the server 10, as indicated by an arrow 72.

Thereafter, the client call counter 28 has a value equal to 4, which will be compared by the program 23 with the synchronization call of the third call sequence 703. Since the server call counter value of the synchronization call of the third call sequence 703 is equal to 10, an overtake condition is detected and the third call sequence 703 is placed into a wait position by the program 23, i.e., will not be directly executed.

Thereafter, since the current client call counter value is still equal to 4, the second call sequence 702 will have a synchronization call with a service call counter value corresponding to the current client call counter value. Accordingly, as indicated by an arrow 76, the thread 2' will be instructed by the program 23 to execute the second call sequence 702.

After the program 23 executes the second call sequence 702, the current client call counter value is equal to 10, as ten service calls are executed so far, and it is determined that the server call counter value of the synchronization call of the third call sequence 703 corresponds to this client call counter value. Accordingly, subsequent to the second call sequence, the third call sequence 703 is placed by the program 23 in a running mode as indicated by arrow 77 and the program 23 directs the third call sequence to be executed by the thread 1'.

After executing the third call sequence 703, the current client counter value is equal to 13, as 13 service calls are executed so far.

When the fourth call sequence 704 was received at the receiver buffer by the program 23, as indicated by the arrow 75, it was placed into a wait position, as the server call counter value of the synchronization call of the fourth call sequence 704, having a counter value of 13, did not correspond to the former current client counter value. However, now the server call counter value of 13 corresponds to the now reached current client call counter value after executing the third call sequence 703 and therefore, the fourth call sequence 704 will now be executed by the program 23 following the third call sequence 703, as indicated by an arrow 78.

Thereafter further call sequences may be executed by the program 23.

The above outlined call sequences describe an example only, and it is understood that any other call sequences involving an arbitrary number of threads at the server unit and an arbitrary number of threads at the client 20 may be handled. The number of threads at the server 10 and the number of threads at the client 20 may further be different.

As shown with the example of FIG. 7, the four call sequences 701, 702, 703 and 704 are executed at the client 20 by the program 23 in the correct sequence, i.e., in the same sequence as before at the server 10, by detecting overtake conditions and placing call sequences into wait positions, as necessary. As for maintaining a synchronization between the server 10 and the client 20, only the synchronization calls are needed, a communication overhead may be kept low.

In the following a further embodiment consistent with the present invention will be described with respect to FIG. 8.

Figure 8:
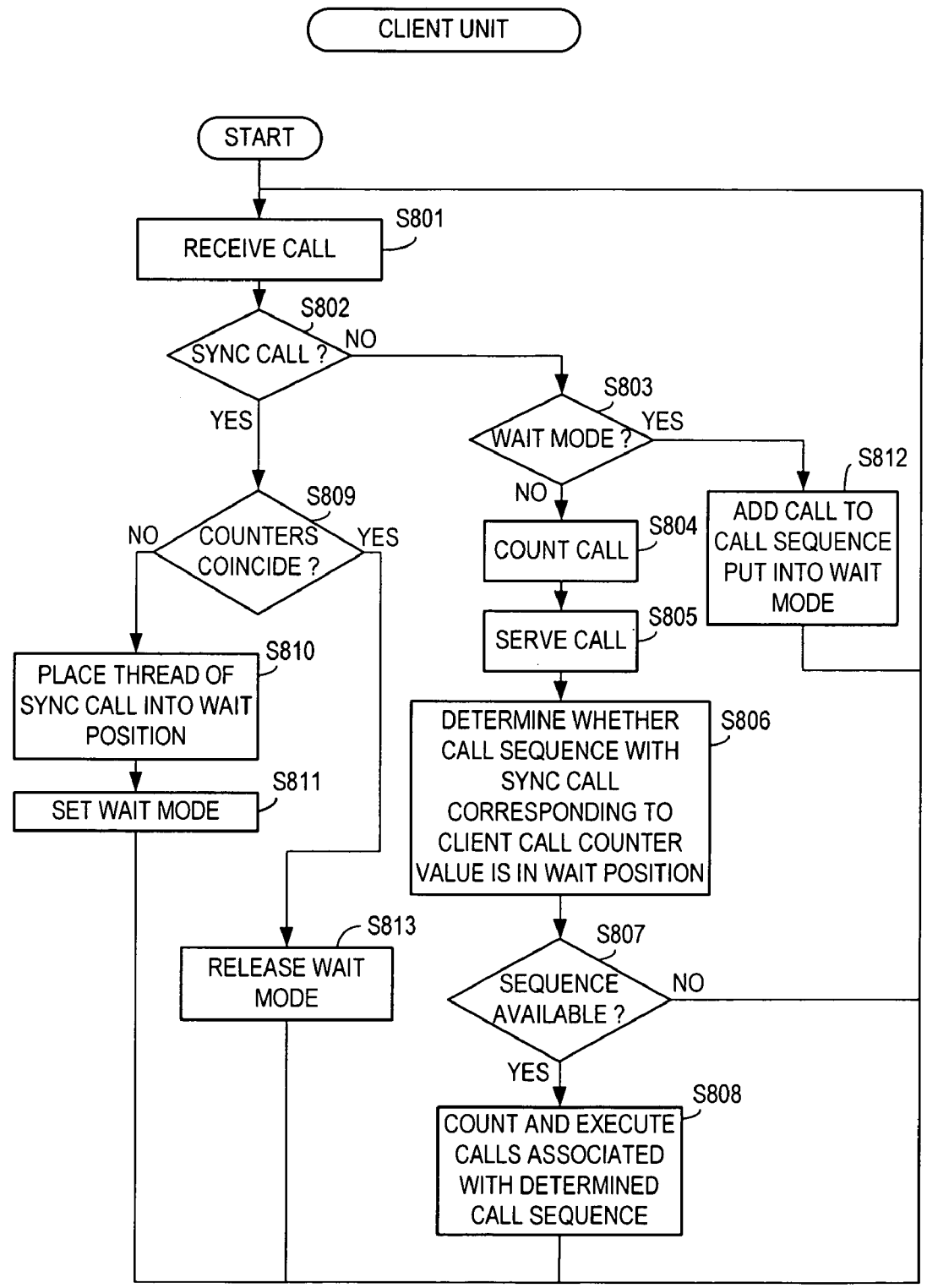
FIG. 8 depicts a flowchart of the steps performed by the program depicted in FIG. 1 according to another embodiment in accordance with methods and systems consistent with the present invention.

FIG. 8 depicts the steps of the methods and systems for synchronizing calls according to an embodiment consistent with the present invention, particularly outlining steps carried out at a client 20. The steps of FIG. 8 may be carried out by the system shown in FIG. 1, however, FIG. 8 is not limited thereto.

FIG. 8 is similar to FIG. 6, however, the respective embodiments differ in the way call sequences in a wait position are treated.

In a first step S801, a call is generated by the program 15 at the server 10, and received at the client, for example client unit 20 of FIG. 1.

In step S802, the program 23 determines at the client 20 whether the received call is a synchronization call, for example, by analyzing the call and determining whether the call includes a server call counter value. If in step S802 the program 23 determines the decision is "NO", indicating that the received call is a service call, in step S803 the program 23 determines whether the client 20 is in a wait mode.

If in step S803 the program 23 determines the decision is "NO", in step S804, the received call is counted and in step S805 the received call is served, as for example outlined before.

It is noted that steps S801-S805 may correspond to steps S601-S605 of the embodiment consistent with the present invention which was described with respect to FIG. 6.

In step S806, the program 23 determines at the client 20 whether a call sequence having a synchronization call with a server call counter value corresponding to the current client call counter value is in a wait position. Thus, the program 23 determines whether a previous call sequence, i.e., a call sequence which has overtaken other call sequences, is in a wait position and has a counter value indicating that this call sequence should now be served.

In step S807, the program 23 determines whether such a call sequence is available. If in step S807 the decision is "YES", in step S808, the calls associated with the determined call sequence are served and counted.

If in step S807 the program 23 determines the decision is "NO", indicating that a suitable call sequence in a wait position is not available, the sequence returns to step S801. It is noted that steps S806-S808 may correspond to steps S609-S611 described with respect to the embodiment of FIG. 6.

If in step S802 the program 23 determines the decision is "YES", indicating that a synchronization call is under consideration, the program 23 determines in step S809, whether the server call counter value included in the synchronization call coincides with the current client call counter value at the client 20. If in step S809 the decision is "NO", indicating that the counters differ, the thread of the call sequence under consideration, i.e., as it may be indicated in the synchronization call, is placed by the program 23 into a wait position.

Thereafter, in step S811 the client 20 is set into a wait mode and thereafter the sequence returns to step S801 for considering the next call.

It is noted that steps S809-S811 may correspond to steps S606-S608 of FIG. 6.

If in step S803 the program 23 determines the decision is "YES", indicating that the client 20 is in the wait mode, in step S812, the call under consideration is added by the program 23 to the call sequence which was put into the wait mode, for example, as outlined with respect to step S612 described with regard to the embodiment of FIG. 6. After step S812, the program 23 returns the sequence to step S801 for considering the next received call.

Finally, if in step S809 the program 23 determines the decision is "YES", indicating that the server call counter value of the synchronization call and the current client call counter value coincide, in step S813, the wait mode is released by the program 23, for example, as outlined with respect to step S613 described with respect to FIG. 6.

The steps outlined above allow the checking of the status of call sequences in a wait position after serving each call and thus, for example, in a situation where the session between a client and a server, such as client unit 20 and server unit 10 of FIG. 1, is shut down, call sequences in a wait position may still be processed, even if no further synchronization call is received.

This allows a reliable closing down of a communication session between the client 20 and the server 10.

It is noted that the above described processing steps of the above embodiments may be realized by dedicated hardware or may be realized as programs including code instructions executed on data processing units, i.e., the server 10 and the client 20. It is further possible that parts of the above sequences of steps are carried out in hardware, whereas others of the above processing steps are carried out using software.

It is further noted that a computer readable medium may be provided, having a program recorded thereon, where the program is to make a computer or system of data processing devices execute functions of the above described operations, particularly of the client and/or the server.

A computer readable medium can be a magnetic or optical or other tangible medium on which a program is recorded, in which the program is embodied for transmission.

Further, a computer program product may be provided comprising the computer readable medium.

According to another embodiment a client 20 may have the following elements:

1) A client in a server and client system for synchronizing calls, including a code section containing instructions to receive service calls generated by a plurality of threads executed at a server and to receive a synchronization call from the server, the synchronization call indicating that a thread executed at the server has changed and indicating a number of service calls generated by threads at the server prior to the thread change; and a code section containing instructions to place at least one service call associated with the synchronization call into a wait position, if the number indicated in the synchronization call and a number of service calls executed at the client prior to receiving the synchronization call differ.

2) The client of 1), including:

a code section containing instructions to receive a first call sequence of a plurality call sequences from a server, the first call sequence including a first synchronization call and at least one service call from a first thread executed at the server, the first synchronization call including a first server call counter value indicating the number of service calls executed at the server prior to the first synchronization call;

a code section containing instructions to compare the first server call counter value and a client call counter value, the client call counter value indicating the number of service calls executed at the client prior to receiving the first synchronization call, and to execute the service calls of the first call sequence;

a code section containing instructions to count the executed service calls using the client call counter value, if the client call counter value and the first server call counter value coincide; and a code section containing instructions to place the first call sequence into the wait position, if the client call counter value and the first server call counter value differ.

3) The client of 1), including:

a code section containing instructions to determine whether a second call sequence in a wait position is available, the second call sequence including service calls from a second thread executed at the server and a second synchronization call including a second server call counter value indicating a number of service calls executed at the server prior to the second synchronization call, the second server call counter value coinciding with the client call counter value;

a code section containing instructions to execute the service calls of the second call sequence and to increment the client counter value for each executed service call, if the second call sequence is available.

4) The client of 1), including a code section containing instructions to set the client into a wait mode, to wait for a third call sequence to be received from the server, the third call sequence including a third synchronization call including a third server call counter value coinciding with the client call counter value.

5) The client of 1), wherein the call sequences are received from the server as packets upon one of the group consisting of:

a timer signal at the server;
a synchronous call at the server; and
a synchronization call at the server.

6) The client of 1), wherein a synchronization call includes a thread ID of the thread which generated the service calls of the call sequence; the service calls include the thread ID of the thread generating the service call; and including a code section containing instructions to receive the synchronization calls and the service calls in an arbitrary order.

7) The client of 1), including:

a code section containing instructions to execute the service calls asynchronously; and a code section containing instructions to execute the service calls from a plurality of different threads at the server in corresponding threads at the client.

8) The client of 1), including a code section containing instructions to store in a client call counter a client call counter value indicating a total number of service calls executed at the client involving communication with the server.

9) The client of 1), wherein each service call from the server unit includes at least one of:

obtaining instructions to display information on a display of the client;
rendering instructions;
storing instructions to store information at the client; and
information on processing results from the server.

According to another embodiment consistent with the present invention, a server may have the following elements.

10) A server in a server and client system, including a code section containing instructions to transmit service calls generated by a plurality of threads at the server to a client;

a code section containing instructions to generate a synchronization call, when a thread executed at the server changes, indicating a number of service calls generated by threads at the server prior to the thread change; and a code section containing instructions to transmit the synchronization call to the client for allowing the client to synchronize a service call execution.

For example, the client may be enabled to place at least one service call associated with the synchronization call into a wait position, if the number indicated in the synchronization call and a number of service calls executed at the client prior to receiving the synchronization call differ.

11) The server of 10), including:

a code section containing instructions to receive a current service call from a first thread executed at the server;

a code section containing instructions to determine a first thread ID of the first thread and to compare the first thread ID with a second thread ID of a second thread which issued a service call preceding the current service call;

a code section containing instructions to generate a first synchronization call including a server call counter value indicating a number of service calls executed at the server prior to the current service call, if the first thread ID and the second thread ID differ;

a code section containing instructions to count the current service call using the server call counter value; and a code section containing instructions to transmit the current service call and the first synchronization call to the client, for enabling the client to synchronize the execution of a plurality of calls from at least the first and second thread.

12) The server of 10), wherein a plurality of service calls from the first thread and the synchronization call constitute a call sequence; and including a code section containing instructions to transmit the call sequence to the client as a packet unit upon one of the group consisting of:
- a timer signal;
- a synchronization call; and
- a synchronous call.

13) The server of 10), wherein the synchronization call includes a thread ID of the second thread; the service calls include the thread ID of the thread generating the service call; and including a code section containing instructions to transmit the synchronization calls and the service calls to the client in an arbitrary order.

14) The server of 10), including:
a code section containing instructions to execute the service calls asynchronously; and wherein the service calls from a plurality of different threads at the server are executed in corresponding threads at the client.

15) The server of 10), including a code section containing instructions to store in a server call counter a server call counter value indicating a total number of service calls at the server executed prior to the current service call and requiring communication with the client.

16) The server of 10), including a code section containing instructions to generate a synchronization call upon the occurrence of one of the group consisting of:
- a timer signal;
- a predetermined number of service calls; and
- a synchronous call.

Having described several embodiments consistent with the present invention in detail, various modifications and improvements will readily occur to those skilled in the art. Such modifications and improvements are intended to be within the spirit and scope of the invention. Accordingly, the foregoing description is by way of example only, and is not intended as limiting.

What is claimed is:

1. A method in a data processing system for synchronizing calls at a client in a server and client system, comprising the steps of:
    receiving from the server a plurality of service calls generated by a plurality of threads executed at the server, wherein said service calls are generated asynchronously;
    receiving a synchronization call from the server, said synchronization call being a separate and different type of call from the service calls and indicating that one of said plurality of threads executed at the server has changed and indicating a number of service calls generated by said plurality of threads at the server prior to the thread change; and
    placing at least one of said service calls associated with said synchronization call into a wait position, said at least one of said service calls corresponding to said changed thread, when said number of service calls indicated in said synchronization call and said number of service calls executed at the client prior to receiving said synchronization call differ,
    wherein said synchronization call and said service calls are received in an arbitrary order; said service calls are associated with said synchronization call by one of including respective identifiers into said at least one of said synchronization call and said service calls, and indicating one of a specific reception sequence and order of service of said service calls and said at least one synchronization call at the client; and said service calls from said plurality of threads at the server are executed in corresponding threads at the client.

2. The method of synchronizing calls according to claim 1, wherein said receiving steps include receiving a first call sequence of a plurality of call sequences from the server, said first call sequence including a first synchronization call and at least one service call from a first thread, said first synchronization call including a first server call counter value indicating a first number of service calls executed at the server prior to the first synchronization call;
    said method further comprising the step of:
    comparing said first server call counter value with a client call counter value, said client call counter value indicating a second number of service calls executed at the client prior to receiving said first synchronization call; and
    one of:
    executing said first number of service calls of said first call sequence and counting said executed first number of service calls using a client call counter value, if said client call counter value and said first server call counter value coincide; and
    placing said first call sequence into a wait position, if said client call counter value and said first server current call counter value differ.

3. The method according to claim 2, further comprising the steps of:
    determining whether a second call sequence in a wait position is available, said second call sequence including a plurality of service calls from a second thread executed at the server and a second synchronization call including a second server call counter value indicating a third number of service calls executed at the server prior to said second synchronization call;
    wherein if said second call sequence in a wait position is not available, waiting to receive further service calls and synchronization calls; and
    wherein if said second call sequence is available, determining that said second server call counter value coincides with said client call counter value, and executing said third number of service calls of said second call sequence and incrementing said client counter value for each executed third number of service calls.

4. The method of according to claim 3, further comprising the step of:
    waiting for a third call sequence to be received from the server unit, the third call sequence including a third synchronization call including a third server call counter value coinciding with said client call counter value.

5. The method according to claim 2, wherein said call sequences are received as groups included into packets from the server, each group being generated upon one of a timer signal at the server, a synchronous call at the server, and a synchronization call at the server.

6. The method according to claim 2, wherein said first server call counter value indicates a total number of service calls at the server executed prior to a current service call and requires communication with the client; and
    wherein said client call counter value indicates a total number of service calls executed at the client and involves communication with the server.

7. The method according to claim 1, wherein each of said service calls from the server includes at least one of:
    obtaining instructions to display information on a display of the client;
    rendering instructions;
    storing instructions to store information at the client; and
    information on processing results from the server.

8. A method in a data processing system for synchronizing calls at a server in a server and client system, comprising the steps of:

transmitting a plurality of service calls generated by a plurality of threads at the server to a client, wherein said service calls are generated asynchronously;

generating a synchronization call when a thread of said plurality of threads executed at the server changes, said synchronization call being a separate and different type of call from the service calls and indicating a number of service calls generated by said plurality of threads at the server prior to the thread change, placing at least one of said service calls associated with said synchronization call into a wait position, said at least one of said service calls corresponding to said changed thread; and transmitting said synchronization call to the client to allow the client to synchronize a service call execution, wherein said service calls from said plurality of threads at the server are executed in corresponding threads at the client said service calls are associated with said synchronization call by one of including respective identifiers into said at least one of said synchronization call and said service calls, and indicating one of a specific reception sequence and order of service of said service calls and said at least one synchronization call at the client; and said synchronization call and said number of service calls are transmitted to the client in an arbitrary order.

9. The method according to claim 8, further comprising the steps of:

generating a current service call by a first thread executed at the server;

determining a first thread identifier of a first thread and comparing said first thread ID with a second thread identifier of a second thread which issued a service call preceding said current service call;

wherein, if said first thread identifier and said second thread identifier differ, generating a first synchronization call including a server call counter value indicating a number of service calls executed at the server prior to said current service call and transmitting said first synchronization call to the client, for enabling the client to synchronize an execution of a plurality of service calls from at least said first thread and said second thread; and counting said current service call using said server call counter value if said first thread identifier and said second thread identifier do not differ.

10. The method according to claim 9, wherein a plurality of service calls from said first thread and said synchronization call comprise a call sequence; and wherein said call sequences are received as groups included into packets from the server, each group being generated upon one of a timer signal at the server, a synchronous call at the server, and a synchronization call at the server.

11. The method according to claim 9, wherein said synchronization call includes said second thread identifier of said second thread, and said number of service calls include a thread identifier of each thread generating said service call.

12. The method according to claim 9, wherein said server call counter value indicates a total number of service calls requiring communication with the client executed at the server, prior to the current service call.

13. The method according to claim 8, wherein each service call from the server includes at least one of:

obtaining instructions to display information on a display of the client;

rendering instructions;

storing instructions to store information at the client; and information on processing results from the server.

14. The method according to claim 8, wherein a synchronization call is further generated upon an occurrence of one of the group consisting of:

a timer signal;

a predetermined number of service calls; and a synchronous call.

15. A method in a data processing system for synchronizing calls in a client and server system, the method comprising the steps of:

transmitting a plurality of service calls generated by a plurality of threads executed at the server to the client, wherein said service calls are generated asynchronously;

generating a synchronization call at the server, said synchronization call being a separate and different type of call from the service calls and indicating that one of said plurality of threads executed at the server has changed and indicating a number of service calls generated by said plurality of threads at the server prior to the thread change;

transmitting said synchronization call to the client to allow the client to synchronize a service call execution;

receiving said synchronization call at the client; and placing at least one of said service calls associated with said synchronization call into a wait position, said at least one of said service calls corresponding to said changed thread, if said number indicated in said synchronization call and said number of service calls executed at the client prior to receiving said synchronization call differ, wherein said synchronization call and said service calls are received in an arbitrary order; said service calls are associated with said synchronization call by one of including respective identifiers into said at least one of said synchronization call and said service calls, and indicating one of a specific reception sequence and order of service of said service calls and said at least one synchronization call at the client; and said service calls from said plurality of threads at the server are executed in corresponding threads at the client.

16. A computer readable storage medium containing instructions that cause a data processing system to perform a method of synchronizing calls in a client and a server system, the method comprising the steps of:

transmitting a plurality of service calls generated by a plurality of threads executed at the server to the client, wherein said service calls are generated asynchronously;

generating a synchronization call at the server, said synchronization call being a separate and different type of call from the service calls and indicating that one of said plurality of threads executed at the server has changed and indicating a number of service calls generated by said plurality of threads at the server prior to the thread change;

transmitting said synchronization call to the client to allow the client to synchronize a service call execution;

receiving said synchronization call at the client; and placing at least one of said service calls associated with said synchronization call into a wait position, said at least one of said service calls corresponding to said changed thread, if said number indicated in said synchronization call and said number of service calls executed at the client prior to receiving said synchronization call differ, wherein said synchronization call and said service calls are received in an arbitrary order; said service calls from said plurality of threads at the server are executed in corresponding threads at the client; and said service calls are associated with said synchronization call by one of including respective identifiers into said at least one of said synchronization call and said service calls, and indicating one of a specific reception sequence and order of service of said service calls and said at least one synchronization call at the client.

17. The computer readable storage medium according to claim 16, wherein said receiving step includes receiving a first call sequence of a plurality of call sequences from the server, said first call sequence including a first synchronization call and at least one service call from a first thread, said first synchronization call including a first server call counter value indicating a first number of service calls executed at the server prior to the first synchronization call;

said method further comprising the step of:
comparing said first server call counter value with a client call counter value, said client call counter value indicating a second number of service calls executed at the client prior to receiving said first synchronization call; and
one of:
executing said first number of service calls of said first call sequence and counting said executed first number of service calls using a client call counter value, if said client call counter value and said first server call counter value coincide; and
placing said first call sequence into a wait position, if said client call counter value and said first server current call counter value differ.

18. The computer readable storage medium according to claim 17, further comprising the steps of:
determining whether a second call sequence in a wait position is available, said second call sequence including a plurality of service calls from a second thread executed at the server and a second synchronization call including a second server call counter value indicating a third number of service calls executed at the server prior to said second synchronization call;
wherein if said second call sequence in a wait position is not available, waiting to receive further service calls and synchronization calls; and
wherein if said second call sequence is available, determining that said second server call counter value coincides with said client call counter value, and executing said third number of service calls of said second call sequence and incrementing said client counter value for each executed third number of service calls.

19. The computer readable storage medium according to claim 18, further comprising the step of:
waiting for a third call sequence to be received from the server unit, the third call sequence including a third synchronization call including a third server call counter value coinciding with said client call counter value.

20. The computer readable storage medium according to claim 17, wherein said call sequences are received as groups included into packets from the server, each group being generated upon one of a timer signal at the server, a synchronous call at the server, and a synchronization call at the server.

21. The computer readable storage medium according to claim 17, wherein said first server call counter value indicates a total number of service calls at the server executed prior to a current service call and requires communication with the client; and wherein said client call counter value indicates a total number of service calls executed at the client and involves communication with the server.

22. The computer readable storage medium according to claim 16, wherein each of said service calls from the server includes at least one of:
obtaining instructions to display information on a display of the client;
rendering instructions;
storing instructions to store information at the client; and
information on processing results from the server.

23. A data processing system for synchronizing calls in a client and server system, the data processing system comprising:
a client computer comprising:
a memory including a client program that receives a plurality of service calls generated by a plurality of threads executed at the server, wherein said service calls are generated asynchronously, that receives a synchronization call from the server, said synchronization call being a separate and different type of call from the service calls and indicating that one of said plurality of threads executed at the server has changed and indicating a number of service calls generated by said plurality of threads at the server prior to the thread change, and that places at least one of said service calls associated with said synchronization call into a wait position, said at least one of said service calls corresponding to said changed thread, if said number indicated in said synchronization call and said number of service calls executed at the client prior to receiving said synchronization call differ; and
a first processor that runs said client program;
a server computer comprising:
a memory including a server program that transmits the plurality of service calls generated by the a plurality of threads at the server to the client, that generates the a synchronization call when a thread of said plurality of threads executed at the server changes,
said synchronization call indicating a number of service calls generated by said plurality of threads at the server prior to the thread change, and that transmits said synchronization call to the client to allow the client to synchronize a service call execution; and
a second processor that runs said server program; and
a network connecting said client computer and said server computer,
wherein said synchronization call and said service calls are received in an arbitrary order; said service calls are associated with said synchronization call by one of including respective identifiers into said at least one of said synchronization call and said service calls, and indicating one of a specific reception sequence and order of service of said service calls and said at least one synchronization call at the client; and said service calls from said plurality of threads at the server are executed in corresponding threads at the client.

24. An apparatus for synchronizing calls in a client and server system, the apparatus comprising:
means for transmitting a plurality of service calls generated by a plurality of threads executed at the server to the client, wherein said service calls are generated asynchronously;

means for generating a synchronization call at the server, said synchronization call being a separate and different type of call from the service calls and indicating that one of said plurality of threads executed at the server has changed and indicating a number of service calls generated by said plurality of threads at the server prior to the thread change;

means for transmitting said synchronization call to the client to allow the client to synchronize a service call execution;

means for receiving said synchronization call at the client; and means for placing at least one of said service calls associated with said synchronization call into a wait position, said at least one of said service calls corresponding to said changed thread, if said number indicated in said synchronization call and said number of service calls executed at the client prior to receiving said synchronization call differ, wherein said synchronization call and said service calls are received in an arbitrary order; said service calls are associated with said synchronization call by one of including respective identifiers into said at least one of said synchronization call and said service calls, and indicating one of a specific reception sequence and order of service of said service calls and said at least one synchronization call at the client; and said service calls from said plurality of threads at the server are executed in corresponding threads at the client.

* * * * *

UNITED STATES PATENT AND TRADEMARK OFFICE
CERTIFICATE OF CORRECTION

| | | |
|---|---|---|
| PATENT NO. | : 7,707,584 B2 | Page 1 of 1 |
| APPLICATION NO. | : 10/021260 | |
| DATED | : April 27, 2010 | |
| INVENTOR(S) | : Carsten Driesner et al. | |

It is certified that error appears in the above-identified patent and that said Letters Patent is hereby corrected as shown below:

On Drawing sheet 3 of 7, in Figure 3, line 2, box "S310" delete "COUTNER" and insert -- COUNTER --, therefor.

In column 29, line 20, in claim 8, delete "client" and insert -- client; --, therefor.

In column 32, line 40, in claim 23, delete "the a" and insert -- a --, therefor.

In column 32, line 41, in claim 23, delete "the a" and insert -- a --, therefor.

Signed and Sealed this
Twelfth Day of April, 2011

David J. Kappos
*Director of the United States Patent and Trademark Office*